United States Patent
Ben Henda et al.

(10) Patent No.: US 11,778,475 B2
(45) Date of Patent: *Oct. 3, 2023

(54) SUPPORTING INTERWORKING AND/OR MOBILITY BETWEEN DIFFERENT WIRELESS COMMUNICATION SYSTEMS

(71) Applicant: Telefonaktiebolaget LM Ericsson (publ), Stockholm (SE)

(72) Inventors: Noamen Ben Henda, Vällingby (SE); Monica Wifvesson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/889,172

(22) Filed: Aug. 16, 2022

(65) Prior Publication Data
US 2022/0394485 A1 Dec. 8, 2022

Related U.S. Application Data

(63) Continuation of application No. 16/332,973, filed as application No. PCT/EP2019/052618 on Feb. 4, 2019, now Pat. No. 11,418,961.
(Continued)

(51) Int. Cl.
*H04M 1/66* (2006.01)
*H04W 12/60* (2021.01)
(Continued)

(52) U.S. Cl.
CPC .......... *H04W 12/60* (2021.01); *H04W 8/02* (2013.01); *H04W 12/106* (2021.01); *H04W 36/0038* (2013.01); *H04W 60/04* (2013.01)

(58) Field of Classification Search
CPC . H04W 12/06; H04W 12/062; H04W 12/065; H04W 12/08; H04W 36/0038; H04W 36/00; H04B 7/18541
See application file for complete search history.

(56) References Cited

U.S. PATENT DOCUMENTS 8,949,927 B2* 2/2015 Arnott ............... H04L 63/20
380/255
2007/0297611 A1* 12/2007 Yun ............... H04W 12/062
380/270

(Continued)

FOREIGN PATENT DOCUMENTS

JP 2013529012 A 7/2013
JP 2017520208 A 7/2017

OTHER PUBLICATIONS

3GPP "3rd Generation Partnership Project; Technical Specification Group 4 Services and System Aspects; Security Architecture and Procedures for 5G System (Release 15)", Technical Specification, 3GPP TS 33.501 V0.8 0, Mar. 1, 2018, pp. 1-130.

(Continued)

*Primary Examiner* — Shantell L Heiber

(57) ABSTRACT

There is provided a method performed by a network unit, and a corresponding network unit as well as a corresponding wireless communication device, for supporting interworking and/or idle mode mobility between different wireless communication systems, including a higher generation wireless system and a lower generation wireless system, to enable secure communication with the wireless communication device. The method comprises selecting, in connection with a registration procedure and/or a security context activation procedure of the wireless communication device with the higher generation wireless system, at least one security algorithm of the lower generation wireless system, also referred to as lower generation security algorithm(s). The method also comprises sending a control message including information on the selected lower generation security algorithm(s) to the wireless communication device. The method further comprises storing information on the selected lower generation security algorithm(s) in the network unit.

20 Claims, 26 Drawing Sheets

Related U.S. Application Data

(60) Provisional application No. 62/632,072, filed on Feb. 19, 2018.

(51) Int. Cl.
*H04W 12/106* (2021.01)
*H04W 8/02* (2009.01)
*H04W 36/00* (2009.01)
*H04W 60/04* (2009.01)

(56) References Cited

U.S. PATENT DOCUMENTS

| | | | |
|---|---|---|---|
| 2008/0069050 A1* | 3/2008 | Dutta | H04W 12/062 370/331 |
| 2010/0115275 A1 | 5/2010 | Suh et al. | |
| 2010/0159882 A1* | 6/2010 | He | H04W 12/0431 455/411 |
| 2010/0263021 A1 | 10/2010 | Arnott et al. | |
| 2011/0090873 A1 | 4/2011 | Lee et al. | |
| 2011/0111731 A1 | 5/2011 | Iwamura et al. | |
| 2012/0039464 A1* | 2/2012 | Xu | H04W 36/0038 380/28 |
| 2013/0042304 A1 | 2/2013 | Rajadurai et al. | |
| 2013/0059565 A1 | 3/2013 | Jung et al. | |
| 2013/0102270 A1* | 4/2013 | Suh | H04W 12/037 455/404.1 |
| 2013/0128866 A1* | 5/2013 | Zhang | H04W 12/08 370/331 |
| 2014/0369315 A1* | 12/2014 | Norrman | H04W 40/04 370/331 |
| 2016/0088472 A1 | 3/2016 | He | |
| 2016/0150449 A1 | 5/2016 | He | |
| 2016/0182522 A1 | 6/2016 | Kwak et al. | |
| 2017/0223538 A1 | 8/2017 | Hahn et al. | |
| 2017/0318463 A1 | 11/2017 | Lee et al. | |
| 2018/0041901 A1 | 2/2018 | Yilmaz et al. | |
| 2018/0041926 A1 | 2/2018 | Zhang et al. | |
| 2019/0104447 A1 | 4/2019 | Horn et al. | |
| 2019/0150219 A1 | 5/2019 | Wang et al. | |
| 2019/0261179 A1 | 8/2019 | Hu et al. | |

OTHER PUBLICATIONS

3GPP, "3rd Generation Partnership Project; Technical Specification Group Services and System Aspects; Study on the security aspects of the next generation sysmtem (Release 14)", 3GPP TR 33.899 V0.6.0, Nov. 25, 2016.

Ericsson, "Proposal for a new subclause 9.Y.X on interworking security in idle mode from 5G to 4G", 3GPP TSG SA WG3 (Security) Meeting #89, S3-173351, Nov. 27-Dec. 1, 2017, Reno, US.

Ericsson, "Solution on inter-working handover from 5G Next Gen to EPC using Nx interface", 3GPP TSG SA WG3 (Security) Meeting #86-Bis, S3-170791, Mar. 27-31, 2017, Busan (South Korea).

Ericsson, Discussion on the NR algorithm bidding-down attack with legacy MME , 3GPP TSG SA WG3 (Security) Meeting #89, S3-173333, Nov. 27-Dec. 1, 2017, Reno.

Ericsson, S3-173346, "Discussion on the security for interworking between EPC and 5GC", 3GPP TSG SA WG3 (Security) Meeting #89, S3-173346, Nov. 27-Dec. 1, 2017, Reno, US.

Intel, "23.502: Way forward for NGC-EPC interworking", 3GPP TSG SA WG2 Meeting #118bis, S2-170333, Jan. 16-20, 2017 Spokane, USA.

* cited by examiner

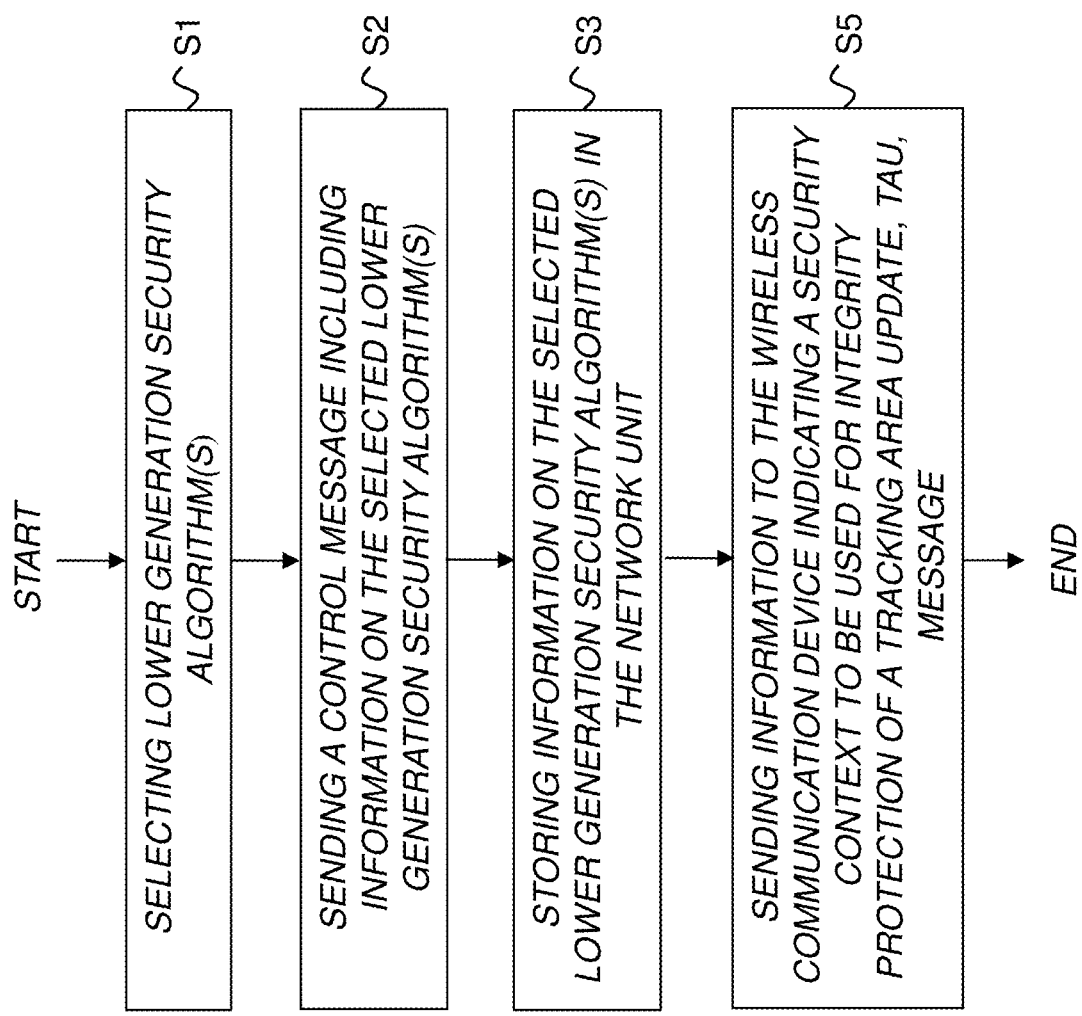

SUPPORTING INTERWORKING AND/OR MOBILITY BETWEEN DIFFERENT WIRELESS COMMUNICATION SYSTEMS

CROSS REFERENCE TO RELATED APPLICATION(S)

This application is a continuation application of U.S. patent application Ser. No. 16/332,973, filed Mar. 13, 2019, granted as U.S. Pat. No. 11,418,961 on Aug. 16, 2022, which is a 35 U.S.C. § 371 National Stage of International Patent Application No. PCT/EP2019/052618, filed Feb. 4, 2019, designating the United States and claiming priority to U.S. provisional application No. 62/632,072, filed on Feb. 19, 2018. The above identified applications are incorporated by reference.

TECHNICAL FIELD

The proposed technology generally relates to mechanisms for supporting interworking and/or mobility between different wireless communication systems, especially between different generations of wireless communication systems including a higher generation wireless system and a lower generation wireless system, and more specifically concerns methods, network units, wireless communication devices, as well as corresponding computer programs and computer-program products and apparatuses.

BACKGROUND

Wireless communication systems are constantly evolving and intense research and development takes place at all over the world.

There is now a wide variety of different types and/or generations of wireless communication systems and technologies, such as Universal Mobile Telecommunications System (UMTS), Long Term Evolution (LTE) and New Generation (NG), sometimes referred to as 3G/4G and 5G.

It may be useful to start with a very brief overview of the Universal Mobile Telecommunications System (UMTS) architecture, sometimes also referred to as 3G, and the Long Term Evolution (LTE) architecture also referred to as 4G.

To start with, the Radio Access Network (RAN) part of the architectures differs in that Universal Terrestrial Radio Access Network (UTRAN) is the 3G/UMTS RAN and Evolved UTRAN (E-UTRAN) is the LTE RAN. UTRAN supports both circuit switched and packet switched services while E-UTRAN only supports packet switched services.

The UTRAN air interface is Wideband Code Division Multiple Access (WCDMA) based on spread spectrum modulation technology while E-UTRAN employs a multi-carrier modulation scheme called Orthogonal Frequency Division Multiple Access (OFDMA). High Speed Packet Access (HSPA) is a set of protocols that extend and improve the performance of existing 3G UMTS networks using the WCDMA protocol.

In 3G/UMTS, the RAN is based on two types of nodes: the access node or base station called NodeB and the Radio Network Controller (RNC). The RNC is the node controlling the RAN, and it also connects the RAN to the Core Network (CN).

FIG. 1 is a schematic diagram illustrating a simplified overview of the core network for UMTS. The core network for UMTS/WCDMA includes:

the Circuit-Switched (CS) domain with the Mobile Switching Center (MSC) for connection to the Public Switched Telephone Network (PSTN);

the Packet-Switched (PS) domain with the Serving GPRS Support Node (SGSN) for connection to the RAN, and the Gateway GPRS Support Node (GGSN) for connection to external networks, such as the Internet.

Common for the two domains is the Home Location register (HLR), a database in the home operator's network that keeps track of the subscribers of the operator.

A key design philosophy of the LTE RAN is to use only one type of node, the evolved Node B, also referred to as eNodeB or eNB. A key concept of the LTE CN is to be independent of the radio access technology to the extent possible.

The LTE RAN functions usually involve:

Coding, interleaving, modulation and other typical physical layer functions;

Automatic Repeat request (ARQ) header compression and other typical link layer functions;

User Plane (UP) security functions, e.g., ciphering, and RAN signaling security, e.g., ciphering and integrity protection of RAN originated signaling to the UE; and Radio Resource Management (RRM), handover, and other typical radio resource control functions.

The LTE CN functions usually involve:

Non-Access Stratum (NAS) security functions, e.g. ciphering and integrity protection of CN signaling to the UE;

Subscriber management;

Mobility management;

Bearer management and Quality of Service (QoS) handling;

Policy control and user data flows;

Interconnection to external networks.

The evolution and standardization of the LTE CN was called the System Architecture Evolution (SAE) and the core network defined in SAE differs radically from the older generation core network and was therefore named the Evolved Packet Core (EPC).

FIG. 2 is a schematic diagram illustrating a simplified overview of the EPC architecture. The basic nodes of the EPC include:

the Mobility Management Entity (MME), which is the control plane node of the EPC;

the Serving Gateway (SG), which is the user plane node connecting the EPC to the LTE RAN; and the Packet Data Network Gateway (PDN) Gateway, which is the user plane node connecting the EPC to the Internet.

The MME is normally also connected to a Home Subscriber Server (HSS), which is a database node corresponding to the HLR.

The Serving Gateway and the PDN Gateway may be configured as a single entity.

Sometimes the EPC together with the LTE RAN is denoted Evolved Packet System (EPS).

Currently, the future generation of wireless communications, commonly referred to as Next Generation (NextGen or NG), Next Generation System (NGS) or 5G, is being developed all over the world, although no common 5G standard has yet been finally set.

The vision of Next Generation wireless communications lies in providing very high data rates, extremely low latency, a manifold increase in base station capacity, and significant improvements of user perceived QoS, compared to current 4G LTE networks.

3GPP is currently developing the standards for 5G. It is expected that 5G will support many new scenarios and use cases and will be an enabler for the Internet of Things, IoT. It is expected that NG systems will provide connectivity to a wide range of new devices such as sensors, smart wearables, vehicles, machines, and so forth. Flexibility would then be a key property in NG Systems. This is reflected in the security requirement for network access that are mandating the support of alternative authentication methods and different types of credentials than the usual Authentication and Key Agreement, AKA, credentials pre-provisioned by the operator and securely stored in the Universal Integrated Circuit Card, UICC or similar device. This would allow factory owners or enterprises to leverage their own identity and credential management systems for authentication and access network security.

The 3GPP architecture working group has finalized the architecture of 5G Systems illustrated in FIG. 3. For more information, reference can be made to TS 23.501.

The Access and Mobility management Function (AMF), sometimes referred to as the Mobility Management Function, MMF, Core Network Mobility Management (CN-MM) or simply Mobility Management (MM), is the network unit or node that supports mobility management and is, thus, playing a similar role to the MME in EPC. AMF has a so-called NG2 interface to RAN that corresponds to the so-called S1 interface between MME and RAN in EPC.

In general, mobility management involves handling UEs in both idle mode and connected mode.

Idle mode mobility in 5G/NGS will probably be a special case of the Registration procedure, e.g. see clause 4.2.2.2.2 in v0.1.1 draft 3GPP TS 23.502. In the Registration procedure, User Equipment (UE) needs to register with the network to get authorized to receive services, to enable mobility tracking and to ensure reachability. The Registration procedure is used e.g. when the UE needs to initially register to the 5G system, upon mobility procedures when the UE changes to a new Tracking Area (TA) in idle mode and when the UE performs a periodic update (due to a predefined time period of inactivity), and so forth.

5G/NGS also allows idle mode mobility from 5G/NGS to 4G/EPS. When a UE moves out of 5G/NGS coverage into 4G/EPS coverage, it will have a 5G/NGS security context, but may not have a 4G/EPS security context.

In order to guarantee a smooth deployment of the 5G Systems, the 3GPP architecture group is currently working on the support of interworking between 3G/4G (legacy) and 5G Systems. This will allow not only idle mobility between the systems but also handovers.

Interworking involves network entities and data objects belonging to different generation systems. The architecture for interworking is given in FIG. 4. For more information, reference can be made to TS 23.501.

The general principle has been to adapt to the older generation in order to minimize impact on legacy infrastructure and ensure a smooth deployment of the new one, and the security mechanisms for interworking should minimize, if not possible to avoid, impact on 3G/4G.

Consequently, the newer generation must adapt to the older generation. Nevertheless, this should not incur restrictions or constraints on the 5G security mechanisms outside of interworking. More precisely, interworking with 3G/4G should not prevent the independent evolution of 5G security, e.g. introducing new crypto algorithms, increasing the size of the MAC fields, etc. In other terms, the security mechanisms for interworking should not prevent the independent evolution of 5G security.

Now, one of the basic security requirements when introducing new features is that they should not break or weaken the security of the overall system. In fact, across generations, the trend has been that the security level did improve. Therefore, the security mechanisms for interworking should maintain at least the same level of security compared to 3G/4G. This does not overrule the introduction of improvements.

The security working group of 3GPP called SA3 is currently working on the security mechanisms for interworking between EPS and 5GS. One of the main working assumptions is that there shall be no impact on the MME. So from the MME perspective, it is communicating with another MME. Therefore, during idle mode mobility, e.g. from 5GS to 4GS, the source AMF should mimic the behavior of a source MME during a Tracking Area Update procedure (TAU) as described in TS 33.401.

In EPS, during a Tracking Area Update procedure, the target MME receives the UE security context from the source MME. The security context includes the necessary parameters to secure the Non-Access Stratum, NAS, protocol, i.e. anchor key KASME and NAS integrity and confidentiality keys and selected NAS security algorithms. The target MME may directly activate NAS security so that all the NAS message with the UE are protected once the security context is received from the source node. If the target MME is configured to run other NAS algorithms, it may then run a NAS Security Mode Command (NAS SMC) procedure to select other algorithms and to signal the new selection to the UE.

Now the current description in TS 33.501 [2] indicates that the source AMF generates a mapped EPS security context from the current 5G security context and delivers it to the target MME. The problem now is which EPS algorithms are to be selected so that the MME can activate the NAS security directly without the need for a NAS SMC procedure. Observe that according to the legacy behavior a NAS SMC run is only required to select other algorithms. So the core of the issue is the selection of the NAS algorithm to be used with EPS.

Two solutions were proposed. Solution (A) is based on selecting void NAS algorithms values so that the target MME is forced to perform a NAS SMC to select new algorithms. More precisely, in the current standards, there are specific values that are reserved for future use, e.g. for new algorithms. This is what is referred to as void values. Solution (B) is based on using a predefined algorithm mapping table included in the standards.

Solution (B) would require continuous standard updates, should new algorithms be introduced for LTE or NR. Solution (A) seems more like a temporary work around and not a proper security design. In addition, using some of the existing undefined values to indicate that no valid algorithms are selected rules them out automatically from being candidates when new algorithms are introduced.

SUMMARY

It is an object to provide improved mechanism for supporting interworking and/or mobility between different wireless communication systems, especially between different generations of wireless communication systems including a higher generation wireless system and a lower generation wireless system.

It is also an object to provide a method, performed by a network unit, for supporting interworking between different wireless communication systems.

Another object is to provide a method, performed by a network unit, for supporting idle mode mobility of a wireless communication device between different wireless communication systems.

Yet another object is to provide a method, performed by a wireless communication device, for supporting interworking between different wireless communication systems.

Another object is to provide a network unit configured to support interworking between different wireless communication systems.

Yet another object is to provide a wireless communication device configured to support interworking between different wireless communication systems.

Still another object is to provide computer programs for supporting, when executed by a processor, interworking between different wireless communication systems, and corresponding computer-program products.

It is also an object to provide apparatuses for supporting interworking between different wireless communication systems.

These and other objects are met by embodiments of the proposed technology.

According to a first aspect, there is provided a method, performed by a network unit, for supporting interworking between different wireless communication systems, including a higher generation wireless system and a lower generation wireless system, to enable secure communication with a wireless communication device, wherein the method comprises:

selecting, in connection with a registration procedure and/or a security context activation procedure of the wireless communication device with the higher generation wireless system, at least one security algorithm of the lower generation wireless system, also referred to as lower generation security algorithm(s);

sending a control message including information on the selected lower generation security algorithm(s) to the wireless communication device; and storing information on the selected lower generation security algorithm(s) in the network unit.

According to a second aspect, there is provided a method, performed by a network unit, for supporting idle mode mobility of a wireless communication device between different wireless communication systems, including a higher generation wireless system and a lower generation wireless system, wherein the method comprises:

selecting, in connection with a registration procedure and/or a security context activation procedure of the wireless communication device with the higher generation wireless system, at least one security algorithm of the lower generation wireless system, also referred to as lower generation security algorithm(s);

sending a control message including information on the selected lower generation security algorithm(s) to the wireless communication device; and storing information on the selected lower generation security algorithm(s) in the network unit.

According to a third aspect, there is provided a method, performed by a wireless communication device, for supporting interworking between different wireless communication systems, including a higher generation wireless system and a lower generation wireless system, to enable secure communication for the wireless communication device, wherein the method comprises:

receiving, in connection with a registration procedure and/or a security context activation procedure of the wireless communication device with the higher generation wireless system, a control message including information on at least one security algorithm of the lower generation wireless system, also referred to as lower generation security algorithm(s);

storing information on the selected lower generation security algorithm(s) in the wireless communication device.

According to a fourth aspect, there is provided a network unit configured to support interworking between different wireless communication systems, including a higher generation wireless system and a lower generation wireless system, to enable secure communication with a wireless communication device, wherein the network unit is configured to select, in connection with a registration procedure and/or a security context activation procedure of the wireless communication device with the higher generation wireless system, at least one security algorithm of the lower generation wireless system, also referred to as lower generation security algorithm(s);

wherein the network unit is configured to send a control message including information on the selected lower generation security algorithm(s) to the wireless communication device; and wherein the network unit is configured to store information on the selected lower generation security algorithm(s) in the network unit.

According to a fifth aspect, there is provided a wireless communication device configured to support interworking between different wireless communication systems, including a higher generation wireless system and a lower generation wireless system, to enable secure communication for the wireless communication device, wherein the wireless communication device is configured to receive, in connection with a registration procedure and/or a security context activation procedure of the wireless communication device with the higher generation wireless system, a control message including information on at least one security algorithm of the lower generation wireless system, also referred to as lower generation security algorithm(s);

wherein the wireless communication device is configured to store information on the selected lower generation security algorithm(s) in the wireless communication device.

According to a sixth aspect, there is provided a computer program for supporting, when executed by a processor, interworking between different wireless communication systems, including a higher generation wireless system and a lower generation wireless system, to enable secure communication with a wireless communication device, wherein the computer program comprises instructions, which when executed by the processor, cause the processor to:

select, in connection with a registration procedure and/or a security context activation procedure of the wireless communication device with the higher generation wireless system, at least one security algorithm of the lower generation wireless system, also referred to as lower generation security algorithm(s);

generate a control message including information on the selected lower generation security algorithm(s) for transmission to the wireless communication device; and store information on the selected lower generation security algorithm(s).

According to a seventh aspect, there is provided a computer-program product comprising a computer-readable medium carrying such a computer program.

According to an eighth aspect, there is provided a computer program for supporting, when executed by a processor, interworking between different wireless communication systems, including a higher generation wireless system and a lower generation wireless system, to enable secure communication for a wireless communication device, wherein the computer program comprises instructions, which when executed by the processor, cause the processor to:

receive, in connection with a registration procedure and/or a security context activation procedure of the wireless communication device with the higher generation wireless system, a control message including information on at least one security algorithm of the lower generation wireless system, also referred to as lower generation security algorithm(s);

store information on the selected lower generation security algorithm(s) in the wireless communication device.

According to a ninth aspect, there is provided a computer-program product comprising a computer-readable medium carrying such a computer program.

According to a tenth aspect, there is provided an apparatus for supporting interworking between different wireless communication systems, including a higher generation wireless system and a lower generation wireless system, to enable secure communication with a wireless communication device, wherein the apparatus comprises:

a selection module for selecting, in connection with a registration procedure and/or a security context activation procedure of the wireless communication device with the higher generation wireless system, at least one security algorithm of the lower generation wireless system, also referred to as lower generation security algorithm(s);

a generating module for generating a control message including information on the selected lower generation security algorithm(s) for transmission to the wireless communication device; and a storage module for storing information on the selected lower generation security algorithm(s) in the network unit.

According to an eleventh aspect, there is provided an apparatus for supporting interworking between different wireless communication systems, including a higher generation wireless system and a lower generation wireless system, to enable secure communication for a wireless communication device, wherein the apparatus comprises:

a receiving module for receiving, in connection with a registration procedure and/or a security context activation procedure of the wireless communication device with the higher generation wireless system, a control message including information on at least one security algorithm of the lower generation wireless system, also referred to as lower generation security algorithm(s);

a storage module for storing information on the selected lower generation security algorithm(s) in the wireless communication device.

According to a twelfth aspect, there is provided a network unit configured to support idle mode mobility of a wireless communication device between different wireless communication systems, including a higher generation wireless system and a lower generation wireless system, wherein the network unit is configured to select, in connection with a registration procedure and/or a security context activation procedure of the wireless communication device with the higher generation wireless system, at least one security algorithm of the lower generation wireless system, also referred to as lower generation security algorithm(s);

wherein the network unit is configured to send a control message including information on the selected lower generation security algorithm(s) to the wireless communication device; and wherein the network unit is configured to store information on the selected lower generation security algorithm(s) in the network unit.

In this way, there is provided an improved solution for supporting interworking and/or mobility between wireless communication systems of different generations.

For example, there is provided a security solution for supporting interworking between wireless communication systems of different generations, such as 5G and 4G, that removes the need for a separate security activation procedure, such as the NAS SMC procedure, with the target system during idle mode mobility.

Rather, the selection of the security algorithms for the target system may be performed and signaled already during security establishment in the source system when the selection and negotiation of the security algorithms for the source system takes place.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 5D is a schematic flow diagram illustrating yet another example of a method for a method, performed by a network unit, for supporting interworking and/or idle mode mobility between different wireless communication systems.

DETAILED DESCRIPTION

Figure 1:
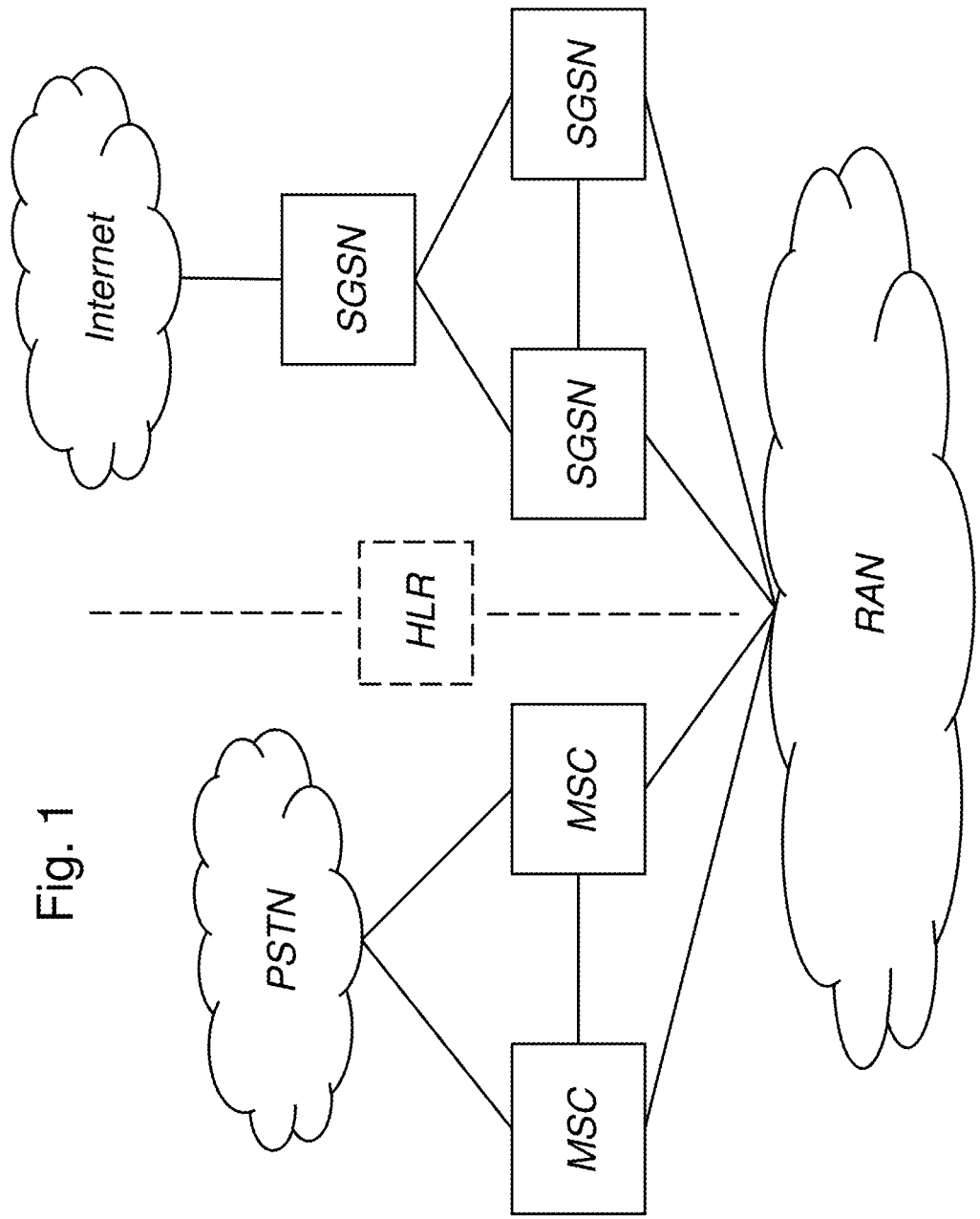
FIG. 1 is a schematic diagram illustrating a simplified overview of the core network for UMTS.
Figure 2:
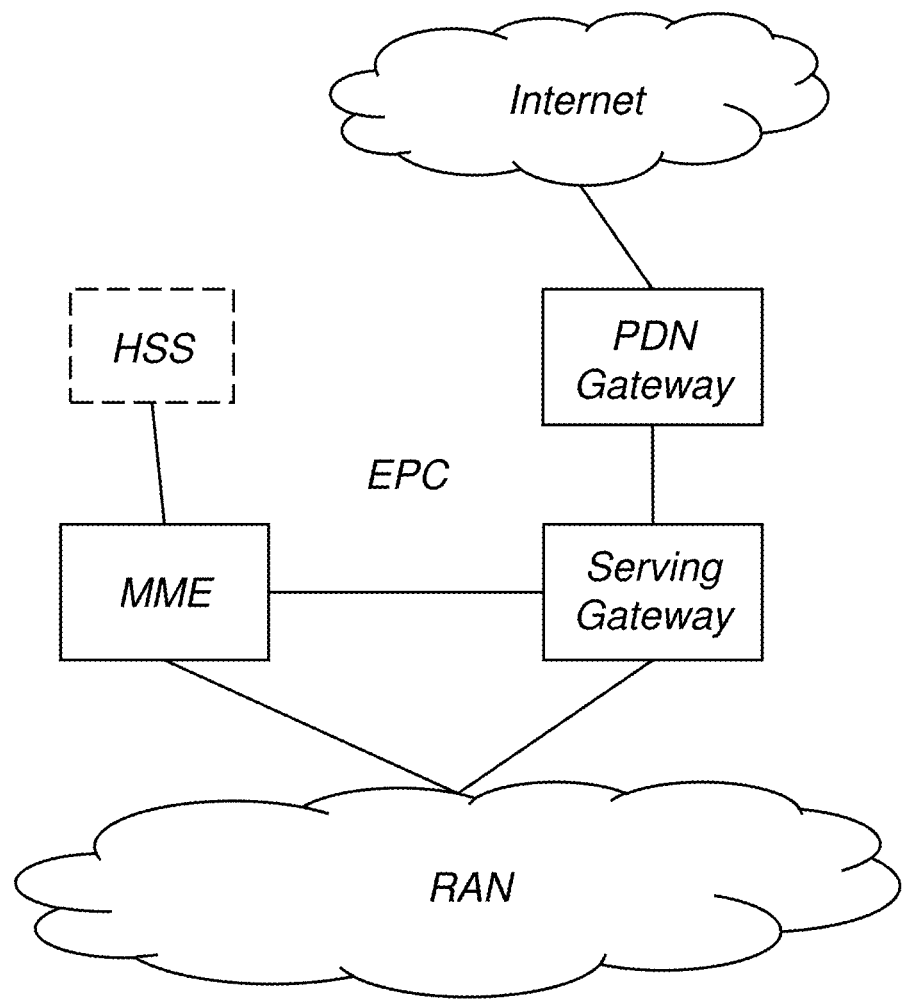
FIG. 2 is a schematic diagram illustrating a simplified overview of the EPC architecture.
Figure 3:
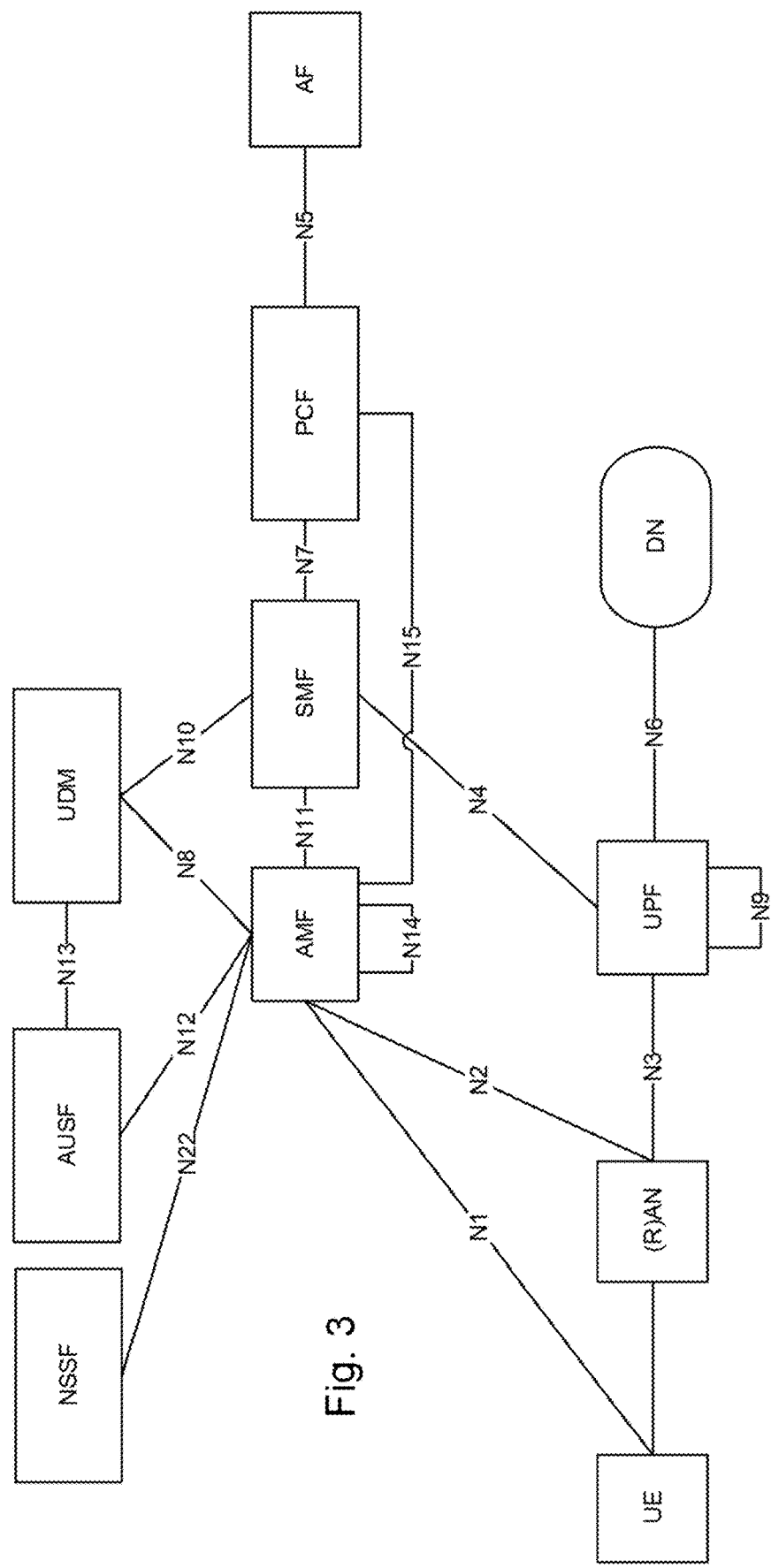
FIG. 3 is a schematic diagram illustrating an example of the non-roaming architecture for 5G/NGS.

Throughout the drawings, the same reference numbers are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The proposed technology generally relates to mechanisms for supporting interworking and/or mobility between different wireless communication systems, especially between different generations of wireless communication systems including a higher generation wireless system and a lower generation wireless system. From context, a higher generation wireless system and a lower generation wireless system are clear to the skilled person, keeping in mind that different generations of wireless communication systems may include 5G, 4G and/or 3G systems.

In the following, the general non-limiting term "network unit" may refer to any network unit suitable for operation in connection with a wireless communication system, including but not limited to network devices, network nodes and/or similar devices.

As used herein, the term "network device" may refer to any device located in connection with a communication network, including but not limited to devices in access networks, core networks and similar network structures. The term network device may also encompass computer-based network devices such as cloud-based network devices for implementation in cloud-based environments.

As used herein, the non-limiting term "network node" may refer to any network node in a communication system including network nodes in access networks, core networks and similar network structures.

As used herein, the non-limiting terms "wireless communication device", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as a non-limiting term comprising any type of wireless device communicating with a network node in a wireless communication system and/or possibly communicating directly with another wireless communication device. In other words, a wireless communication device may be any device equipped with circuitry for wireless communication according to any relevant standard for communication.

It may be useful to start with a brief overview of interworking wireless communication systems.

Figure 5A:
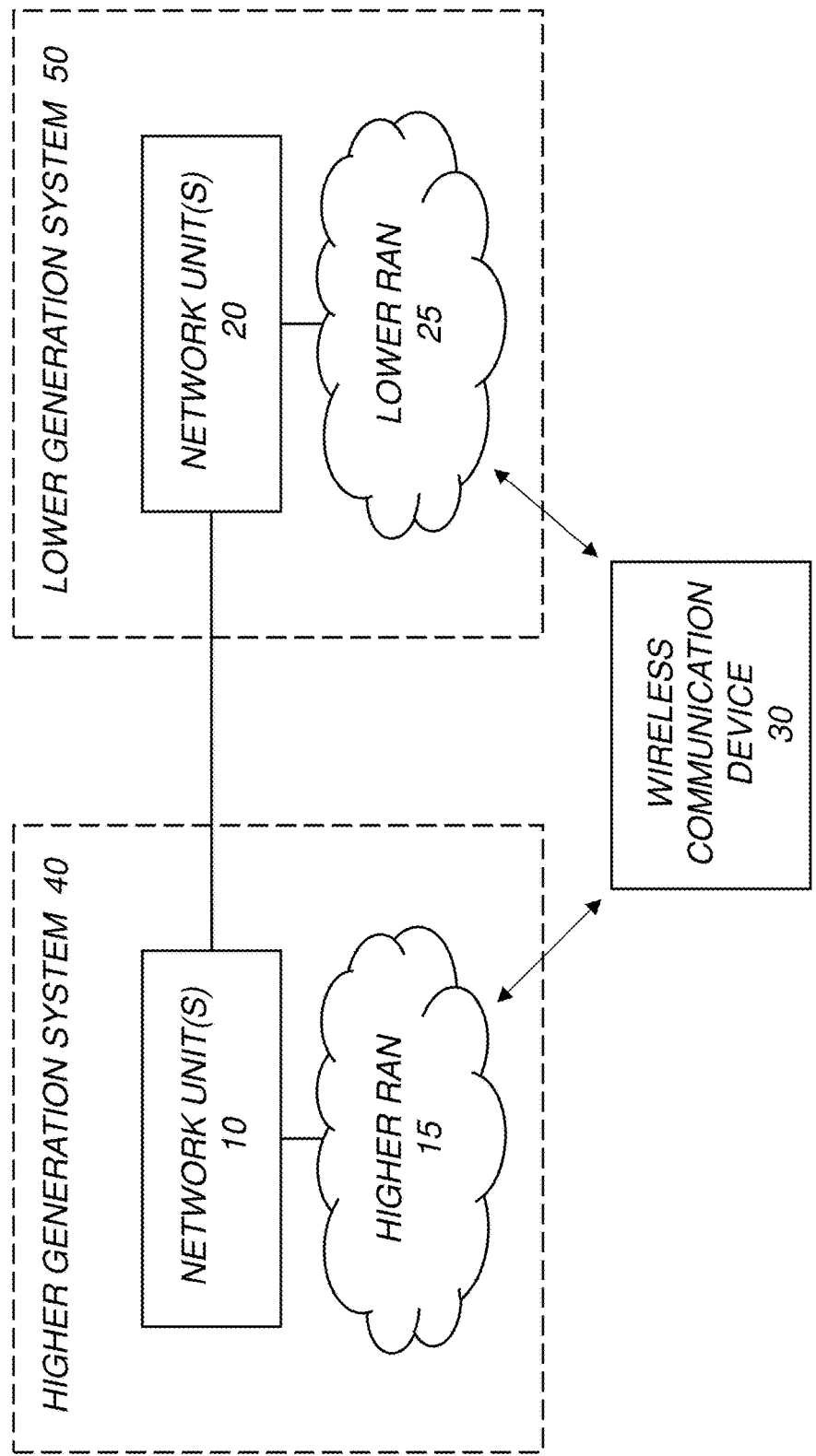
FIG. 5A is a schematic diagram illustrating an example of two different wireless communication systems capable of interworking according to an embodiment.

FIG. 5A is a schematic diagram illustrating an example of two different wireless communication systems capable of interworking according to an embodiment. In this example, there is provided a schematic overview of an architecture for supporting interworking and/or idle mode mobility between different wireless communication systems, including a higher generation wireless system 40 and a lower generation wireless system 50, to enable secure communication with a wireless communication device 30. The higher generation wireless system 40 may include one or more network units 10 cooperating with a corresponding higher generation radio access network (RAN) 15 to provide wireless communication services to the wireless communication device 30. Similarly, the lower generation wireless system 50 may include one or more network units 20 cooperating with a corresponding lower generation radio access network (RAN) 25 to provide wireless communication services to the wireless communication device 30. The network unit(s) 10 of the higher generation wireless system 40 and the network unit(s) 20 of the lower generation wireless system 50 may be directly and/or indirectly interconnected to enable efficient exchange of information for supporting interworking and/or mobility.

Figure 5B:
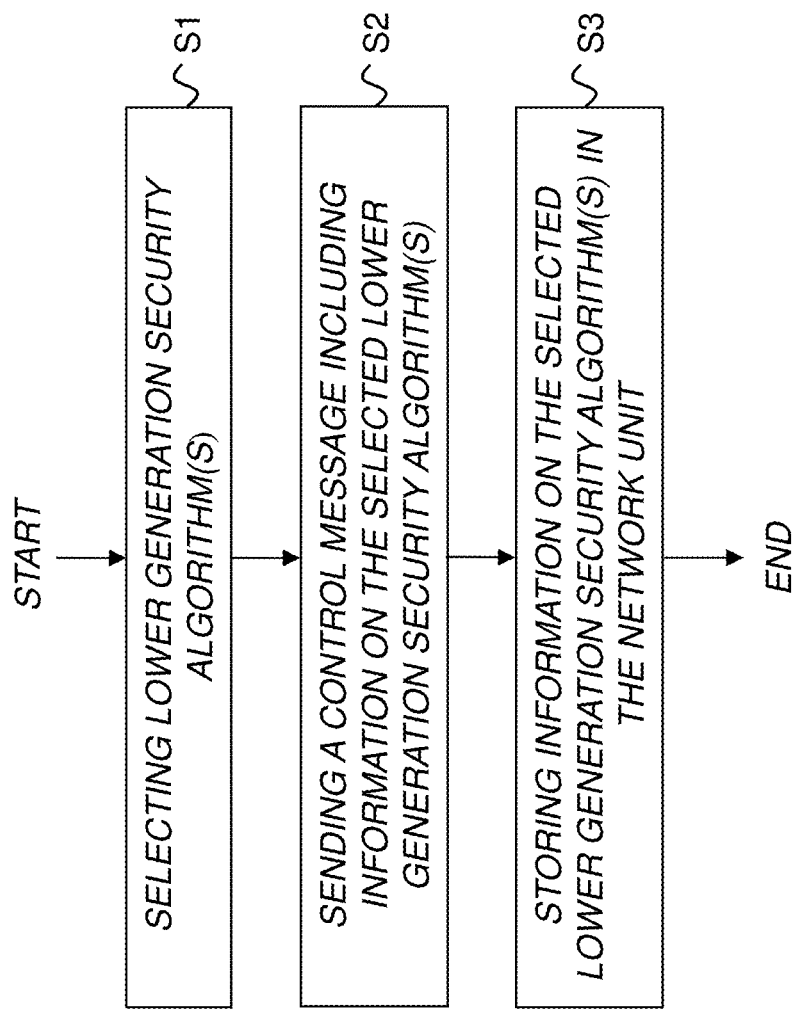
FIG. 5B is a schematic flow diagram illustrating an example of a method for a method, performed by a network unit, for supporting interworking and/or idle mode mobility between different wireless communication systems.

FIG. 5B is a schematic flow diagram illustrating an example of a method for a method, performed by a network unit, for supporting interworking and/or idle mode mobility between different wireless communication systems, including a higher generation wireless system and a lower generation wireless system, to enable secure communication with a wireless communication device.

Basically, the method comprises:

S1: selecting, in connection with a registration procedure and/or a security context activation procedure of the wireless communication device with the higher generation wireless system, at least one security algorithm of the lower generation wireless system, also referred to as lower generation security algorithm(s);

S2: sending a control message including information on the selected lower generation security algorithm(s) to the wireless communication device; and S3: storing information on the selected lower generation security algorithm(s) in the network unit.

Sometimes the expression security context activation procedure is referred to as a security activation procedure for a wireless communication device.

A security context normally includes at least one security key, possibly together with optional related information such as one or more freshness parameters and/or information on security algorithms that can be used.

For example, the method may be performed by a network unit 10 of the higher generation wireless system 40 when the wireless communication device 30 registers and initiates establishment of a security context with the higher generation wireless system 40.

By way of example, the network unit 10 of the higher generation wireless system 40 may be a core network unit configured for mobility management such as an Access and Mobility management Function, AMF, unit.

In another example, the network unit 10 of the higher generation wireless system 40 is a cloud-based network unit.

In a particular example, the control message is a security context activation procedure command.

For example, the control message may be a Non-Access Stratum, NAS, Security Mode Command, SMC, message.

As an example, the lower generation security algorithm(s) is/are selected based on the security capabilities of the wireless device in the higher generation wireless system, which is a superset of the security capabilities of the wireless device in the lower generation wireless system.

For example, information on the security capabilities of the wireless device in the lower generation wireless system are included in information on the security capabilities of the wireless device in the higher generation wireless system.

In a particular example, information on the security capabilities of the wireless device is received in a Registration Request in the higher generation wireless system.

Optionally, the control message also includes information on selected higher generation security algorithm(s).

As an example, the higher generation wireless system 40 is a source system and the lower generation wireless system 50 is a target system during idle mode mobility.

In a first set of examples, the higher generation wireless system 40 is a 5G/NGS system and the lower generation wireless system 50 is a 4G/EPS system.

In a second set of alternative and/or complementary examples, the higher generation wireless system 40 is a 5G/NGS system and the lower generation wireless system 50 is a 3G/UMTS system.

In a third set of examples, the higher generation wireless system 40 is a 4G/EPS system and the lower generation wireless system 50 is a 3G/UMTS system.

For 3G, the signaling protocol between the UE 30 and the core network is the GPRS Mobility Management (GMM) with its GMM procedures; for 4G and 5G it is called Non-Access Stratum (NAS).

Figure 5C:
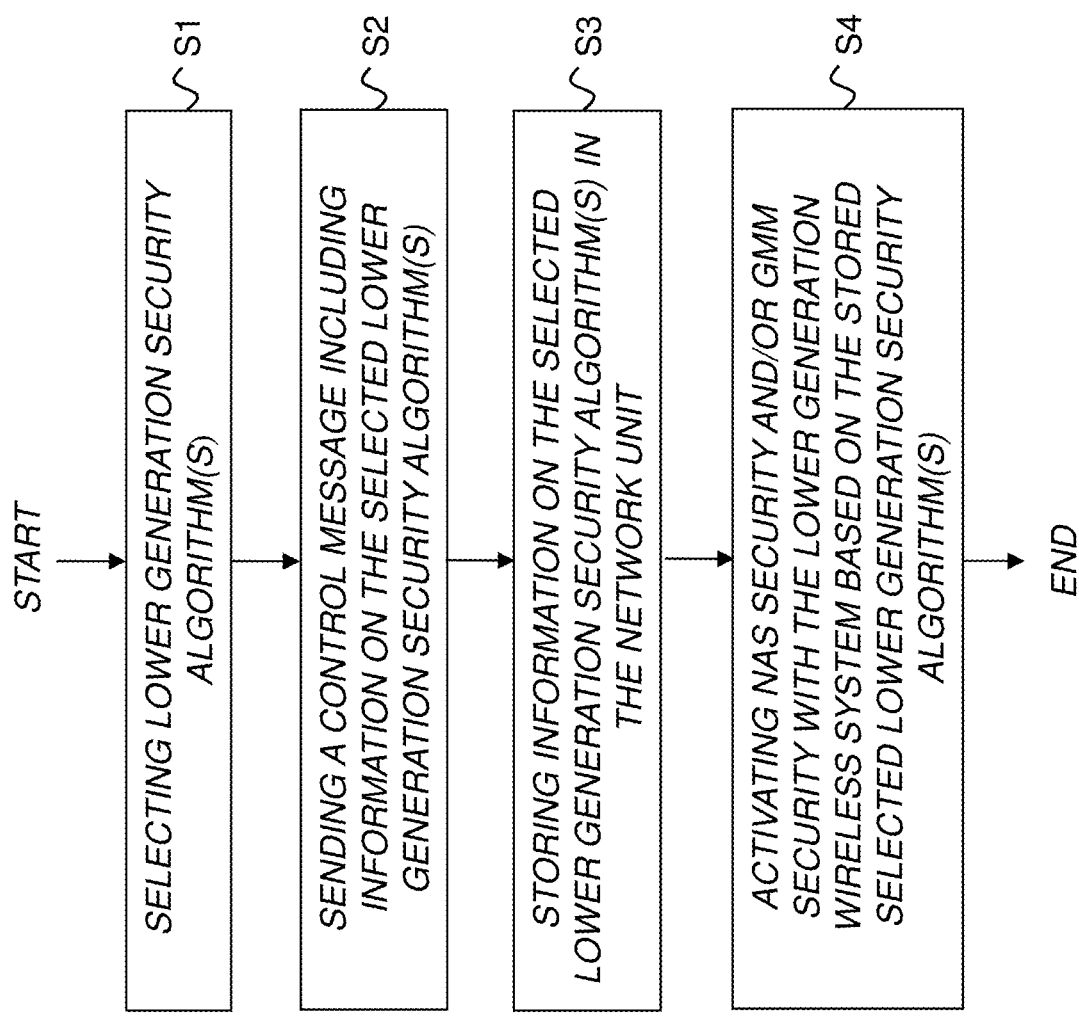
FIG. 5C is a schematic flow diagram illustrating another example of a method for a method, performed by a network unit, for supporting interworking and/or idle mode mobility between different wireless communication systems.

By way of example, with reference to the example of FIG. 5C, the method further comprises activating S4 NAS security and/or GMM security with the lower generation wireless system 50 based on the stored selected lower generation security algorithm(s) during idle mode mobility of the wireless communication device 30.

Optionally, with reference to the specific example of FIG. 5D, the method further comprises sending S5 information to the wireless communication device 30 indicating a security context to be used for integrity protection of a Tracking Area Update, TAU, message.

For example, the information indicating a security context to be used for integrity protection of a TAU message may be sent together with the information on the selected lower generation security algorithm(s) in the control message.

In a particular example, the information indicating a security context to be used for integrity protection of a TAU message includes information indicating whether a higher generation security context or a lower generation security context is to be used for integrity protection of the TAU message.

Optionally, the method further comprises storing the information indicating a security context to be used for integrity protection of a TAU message in the network unit.

The method may also involve sending the information on the selected lower generation security algorithm(s) to a network unit, such as a MME, of the lower generation wireless system, e.g. for use in activating NAS security and/or GMM security.

For example, during idle mode mobility, upon the reception of a Context Request message from the target MME, the source AMF may derive a mapped EPS security context where the selected algorithms are based on the one stored and signaled during a NAS SMC with the UE. Similarly, the UE derives a mapped EPS security context such that the EPS algorithms are set based on the currently stored one that has been selected during a NAS SMC. The target MME activates NAS security immediately after the reception of the security context in the Context Response message.

More specifically, according to a second aspect, there is provided a method, performed by a network unit, for supporting idle mode mobility of a wireless communication device between different wireless communication systems, including a higher generation wireless system and a lower generation wireless system.

With reference once again to FIG. 5B, the method basically comprises:

S1: selecting, in connection with a registration procedure and/or a security context activation procedure of the wireless communication device with the higher generation wireless system, at least one security algorithm of the lower generation wireless system, also referred to as lower generation security algorithm(s);

S2: sending a control message including information on the selected lower generation security algorithm(s) to the wireless communication device; and S3: storing information on the selected lower generation security algorithm(s) in the network unit.

Alternatively, the proposed technology is regarded as a method and corresponding network unit for security algorithm selection for supporting interworking between different wireless communication systems, including a higher generation wireless system and a lower generation wireless system.

By way of example, the control message may be a security context activation procedure command.

In a particular example, the control message is a Non-Access Stratum, NAS, Security Mode Command, SMC, message.

Optionally, the control message also includes information on selected higher generation security algorithm(s).

For example, the method is designed for supporting idle mode mobility from a higher generation wireless system to a lower generation wireless system.

In a particular example, the stored selected lower generation security algorithm(s) is/are used during idle mode mobility of the wireless communication device to activate NAS security and/or GMM security with the lower generation wireless system.

In a first set of examples, the higher generation wireless system is a 5G/NGS system and the lower generation wireless system is a 4G/EPS system.

In a second set of alternative and/or complementary examples, the higher generation wireless system is a 5G/NGS system and the lower generation wireless system is a 3G/UMTS system.

In a third set of examples, the higher generation wireless system is a 4G/EPS system and the lower generation wireless system is a 3G/UMTS system.

Figure 6A:
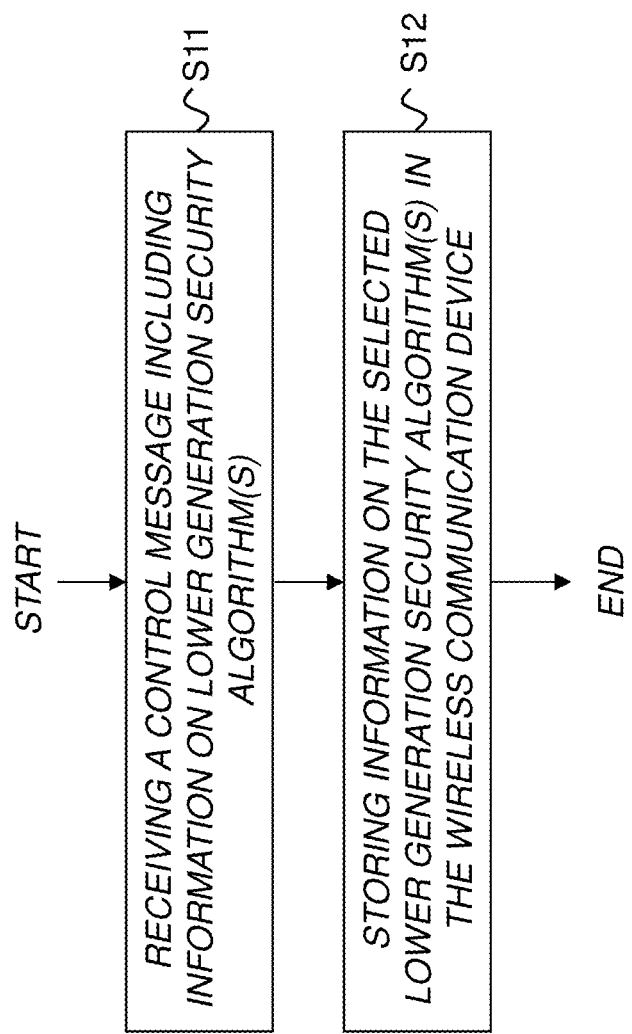
FIG. 6A is a schematic flow diagram illustrating an example of a method, performed by a wireless communication device, for supporting interworking between different wireless communication systems.

FIG. 6A is a schematic flow diagram illustrating an example of a method, performed by a wireless communication device, for supporting interworking between different wireless communication systems, including a higher generation wireless system and a lower generation wireless system, to enable secure communication for the wireless communication device.

Basically, the method comprises:

S11: receiving, in connection with a registration procedure and/or a security context activation procedure of the wireless communication device with the higher generation wireless system, a control message including information on at least one security algorithm of the lower generation wireless system, also referred to as lower generation security algorithm(s);

S12: storing information on the selected lower generation security algorithm(s) in the wireless communication device.

By way of example, the control message may be a security context activation procedure command.

In a particular example, the control message is a Non-Access Stratum, NAS, Security Mode Command, SMC, message.

Optionally, the method further comprises receiving information indicating a security context to be used for integrity protection of a Tracking Area Update, TAU, message.

Figure 6B:
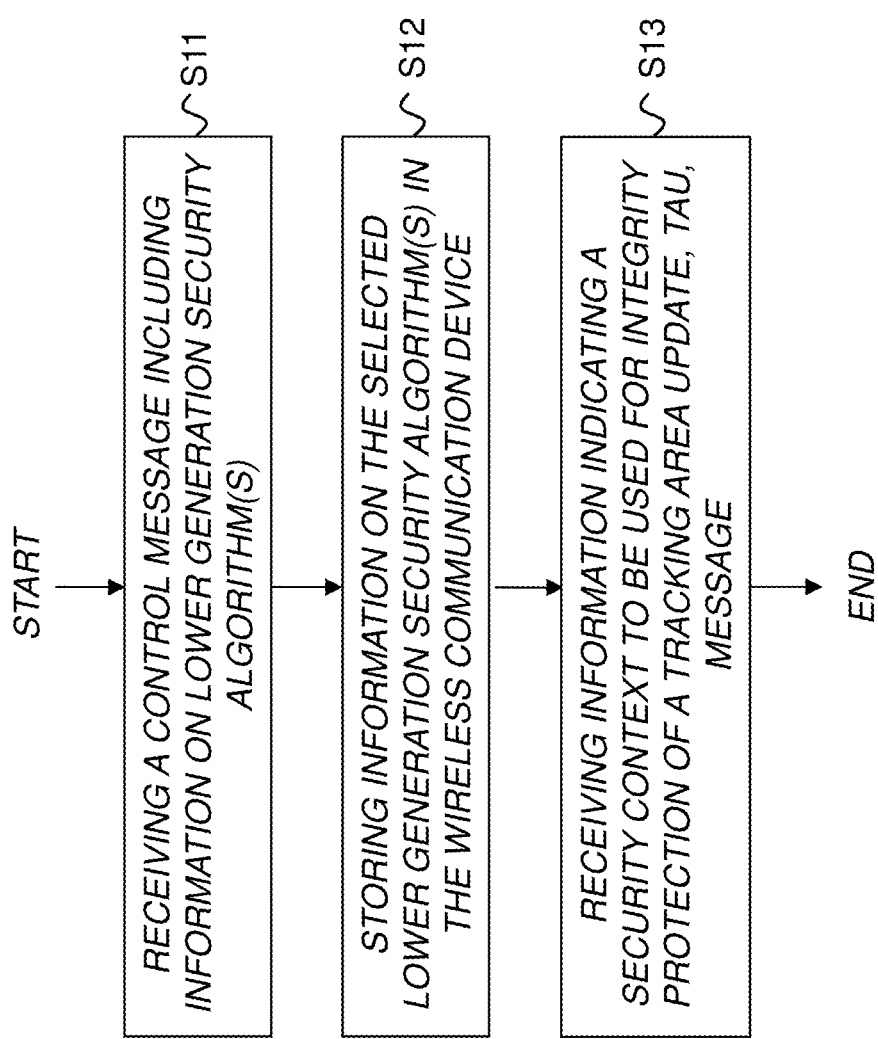
FIG. 6B is a schematic flow diagram illustrating another example of a method, performed by a wireless communication device, for supporting interworking between different wireless communication systems.

Optionally, with reference to the example of FIG. 6B, the method further comprises storing S13 the information indicating a security context to be used for integrity protection of a TAU message in the wireless communication device 30.

For example, the information indicating a security context to be used for integrity protection of a TAU message may be received together with the information on the selected lower generation security algorithm(s) in the control message.

In a first set of examples, the higher generation wireless system 40 is a 5G/NGS system and the lower generation wireless system 50 is a 4G/EPS system.

In a second set of alternative and/or complementary examples, the higher generation wireless system 40 is a 5G/NGS system and the lower generation wireless system 50 is a 3G/UMTS system.

In a third set of examples, the higher generation wireless system 40 is a 4G/EPS system and the lower generation wireless system 50 is a 3G/UMTS system.

It should be understood that the proposed technology is generally applicable for supporting interworking between different generations of wireless communication systems such as 5G, 4G and/or 3G, in different combinations. For example, as already mentioned, 5GS may support interworking with 4GS and/or 3GS, and it is possible to include information on 4GS/EPS security algorithms and/or information on any older generation security algorithms such as 3GS security algorithms for any system generation that the network supports interworking with.

In the following, the proposed technology will be described with reference to a number of non-limiting examples in the context of interworking between 5GS/NGS and 4GS/EPS.

By way of example, it is proposed to signal the EPS algorithms to be used during interworking already during the NAS SMC procedure when the UE initially registers in the 5G System and establishes the NAS security context. Therefore, there would be no need to use void values to trigger a NAS SMC or to use a predefined standardized mapping table. The selection is done at the AMF side based on the UE 5G security capabilities that are assumed to a be a superset of the UE EPS security capabilities and received in the Registration Request message. The selected EPS algorithms are signaled in the NAS SMC alongside the selected 5G algorithms Such a solution may provide one or more the following advantages:

It does not rely on a predefined standardized algorithm mapping table that would require continuous updates to the standards whenever new algorithms are introduced.

It does not misuse reserved algorithm values to force trigger a NAS SMC.

It allows the activation of the NAS security context at the UE and the target MME directly without a NAS SMC run.

It allows the independent evolutions of the EPS and 5GS security algorithms.

It reuses the existing mechanism for secure algorithm negotiation.

In a particular example, there is provided a security solution for interworking between EPS and 5GS that removes the need for an activation procedure run (NAS SMC) with the target system during idle mode mobility from 5GS to EPS in order to negotiate and select the EPS algorithms to be used with the target system, by mandating the selection of the EPS algorithms already during security establishment in the source system to, optionally based on local configuration, occur during the selection and negotiation of the 5G security algorithms.

Figure 4:
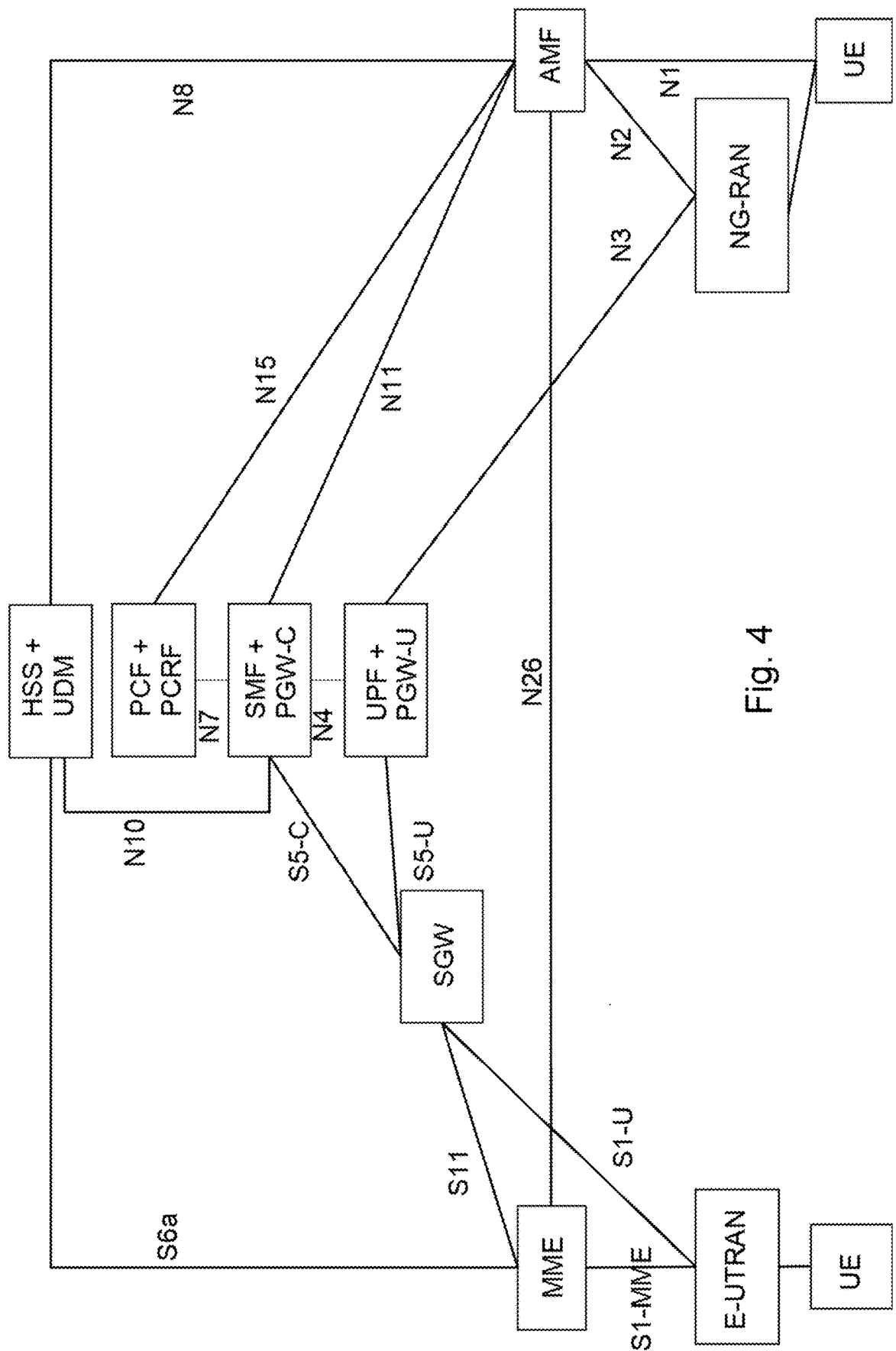
FIG. 4 is a schematic diagram illustrating an example of an architecture for interworking between wireless systems of different generations.

The support of the N26 interface of FIG. 4 which allows the exchange of UE information including security between AMF and MME is optional. Therefore, interworking between EPS and 5GS using the N26 interface is optional. In addition, in the interworking architecture of FIG. 4, since the MME and AMF are connected to the same HSS+/UDM node, this indicates that all the nodes belong to the same operator network (owner of the HSS). Consequently, interworking using the N26 interface is not only optional, it is also an operator choice. Even if two different operators are still managing the MME and AMF, there would be agreement between the two parties to support and use the interface.

This suggests that whoever is managing the AMF, he could locally configure any additional information required for the usage of the N26 interface. Therefore, it would be logical to configure in advance the EPS algorithms to be used during idle mode mobility from 5GS to EPS using the N26 interface. In case interworking is within the same operator network, then the operator would be aware of the MME capabilities and could configure the information in the AMF accordingly. Otherwise, it could be based on the agreement with another operator. It could be even configured randomly so that the UE gets the selection. The target MME can always select other algorithms.

By way of example, it is proposed that based on its local configuration, the AMF optionally includes the EPS algorithms to be used solely during interworking with EPS. The selection of the EPS algorithms could be based on the UE 5G security capabilities and a local configuration information for example a prioritized list of algorithms. Observe that here it is assumed that the 5G security capabilities are a superset of the EPS security capabilities which in turn includes the previous generation security capabilities. The EPS selected algorithms are signaled to the UE during the NAS SMC procedure which is typically run after a successful primary authentication.

Figure 7:
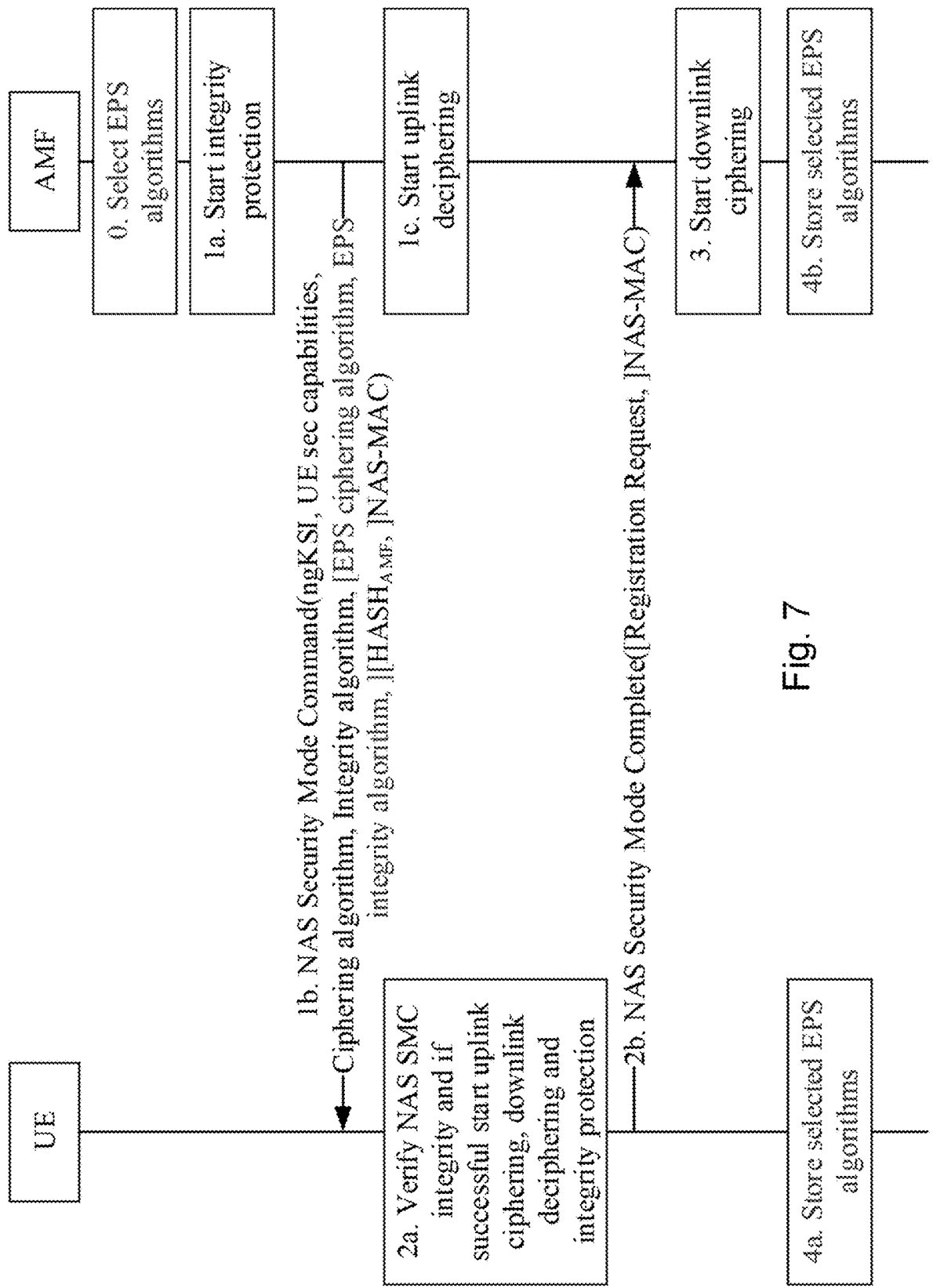
FIG. 7 is a schematic diagram illustrating an example of a NAS SMC procedure with 4GS/EPS algorithm selection according to an embodiment.

FIG. 7 is a schematic diagram illustrating an example of a NAS SMC procedure with 4GS/EPS algorithm selection according to an embodiment. FIG. 7 includes the changes on top of the currently defined flow from TS 33.501.

In step 0, the AMF selects the EPS algorithms as described above based on local configuration and depending whether interworking using the N26 interface is supported in this network or not. In step 1a, integrity protection is started. The selected EPS algorithms are included in the NAS Security Mode Command message from the AMF to the UE alongside the other security information as highlighted in step 1b. In step 2a, NAS SMC integrity is verified and if successful, uplink ciphering, downlink deciphering and integrity protection are started. In step 2b, the NAS Security Mode Complete message is sent from the UE to the AMF, and downlink ciphering is started in step 3. After a successful completion of the NAS SMC run, the selected EPS security algorithms are stored in the UE and the AMF side as part of the UE security context in steps 4a and 4b.

Figure 8:
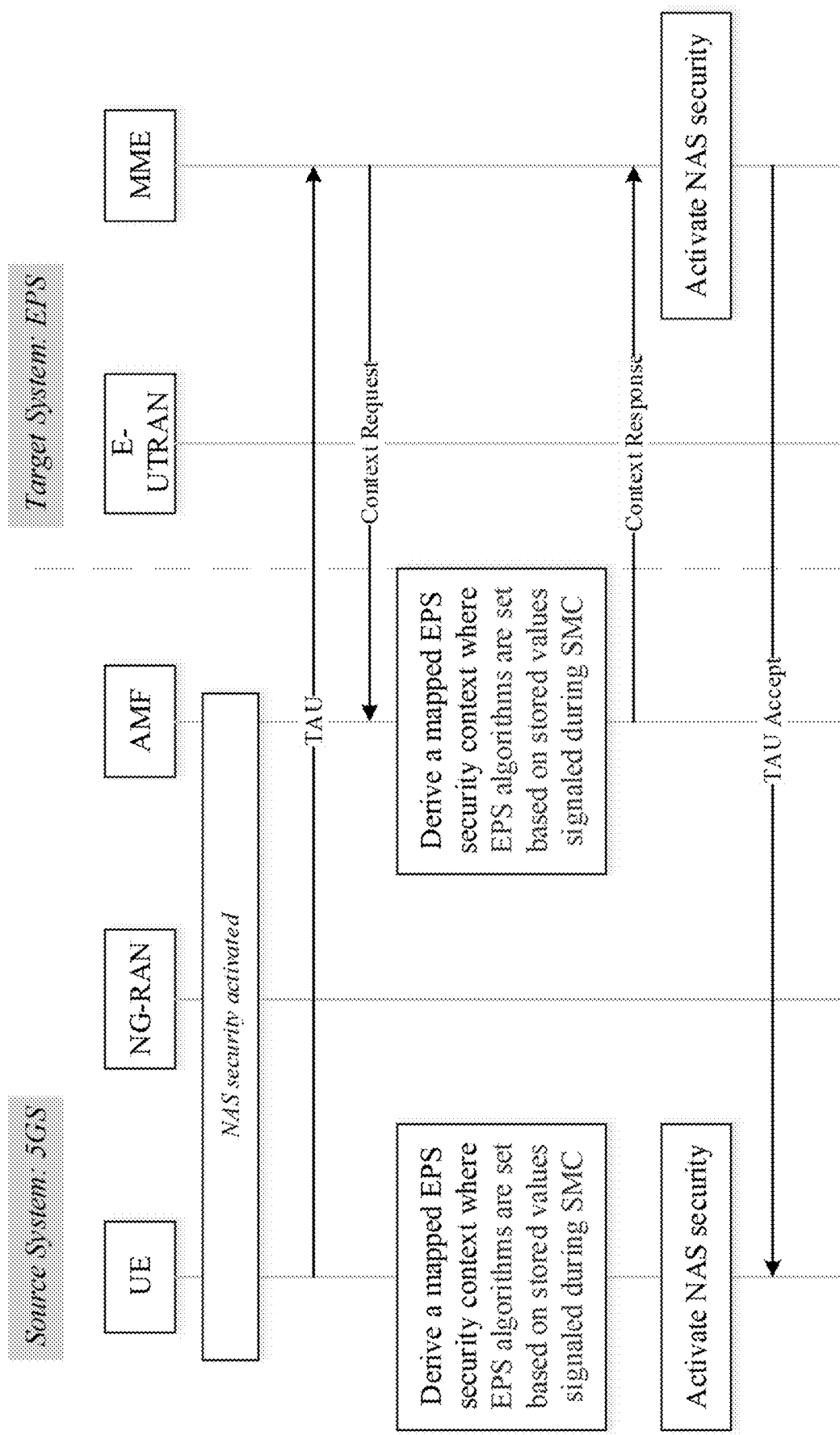
FIG. 8 is a schematic diagram illustrating an example of usage of preselected 4GS/EPS algorithm(s) during idle mode mobility from 5GS/NGS to 4GS/EPS.

FIG. 8 is a schematic diagram illustrating an example of usage of preselected 4GS/EPS algorithm(s) during idle mode mobility from 5GS/NGS to 4GS/EPS. FIG. 8 shows how the stored information is used during idle mode mobility to EPS to activate NAS security without a NAS SMC run.

Upon the reception of the Context Request message from the target MME, the source AMF derives a mapped EPS security context where the selected algorithms are based on the one stored and signaled during a NAS SMC with the UE. Similarly, the UE derives a mapped EPS security context such that the EPS algorithms are set based on the currently stored one that has been selected during a NAS SMC. The target MME activates NAS security immediately after the reception of the security context in the Context Response message. The UE does the same possibly before or after the TAU message. The final TAU procedure message (the TAU Accept message) would be then confidentiality and integrity protected. Observe that according to the legacy behavior, the target MME can always initiate a NAS SMC to select different algorithms before the TAU Accept message.

In general, when a security context is available, the TAU message shall be sent integrity protected. On the protection of the TAU message two solutions were proposed. Solution (A) is based on using the 5G security context to protect the TAU message. Solution (B) is based on using the mapped EPS security context to protect the TAU message. Both solutions have advantages and disadvantages.

For Solution (A), the upside is that the source AMF does not need to support other than the currently supported 5G NAS integrity algorithm. However, on the UE side, this solution is not legacy implementation friendly since it would require changes to the EPS NAS implementation. For Solution (B), it is the other way around. Observe that for both solutions, unless the verification of the TAU message fails, the source AMF will have to send a mapped EPS security context to the target MME.

In this embodiment, it is proposed that an indication is optionally sent to the UE alongside the selected EPS algorithms to indicate whether the UE uses the mapped EPS security context or the 5G security context to protect the TAU message.

Figure 9:
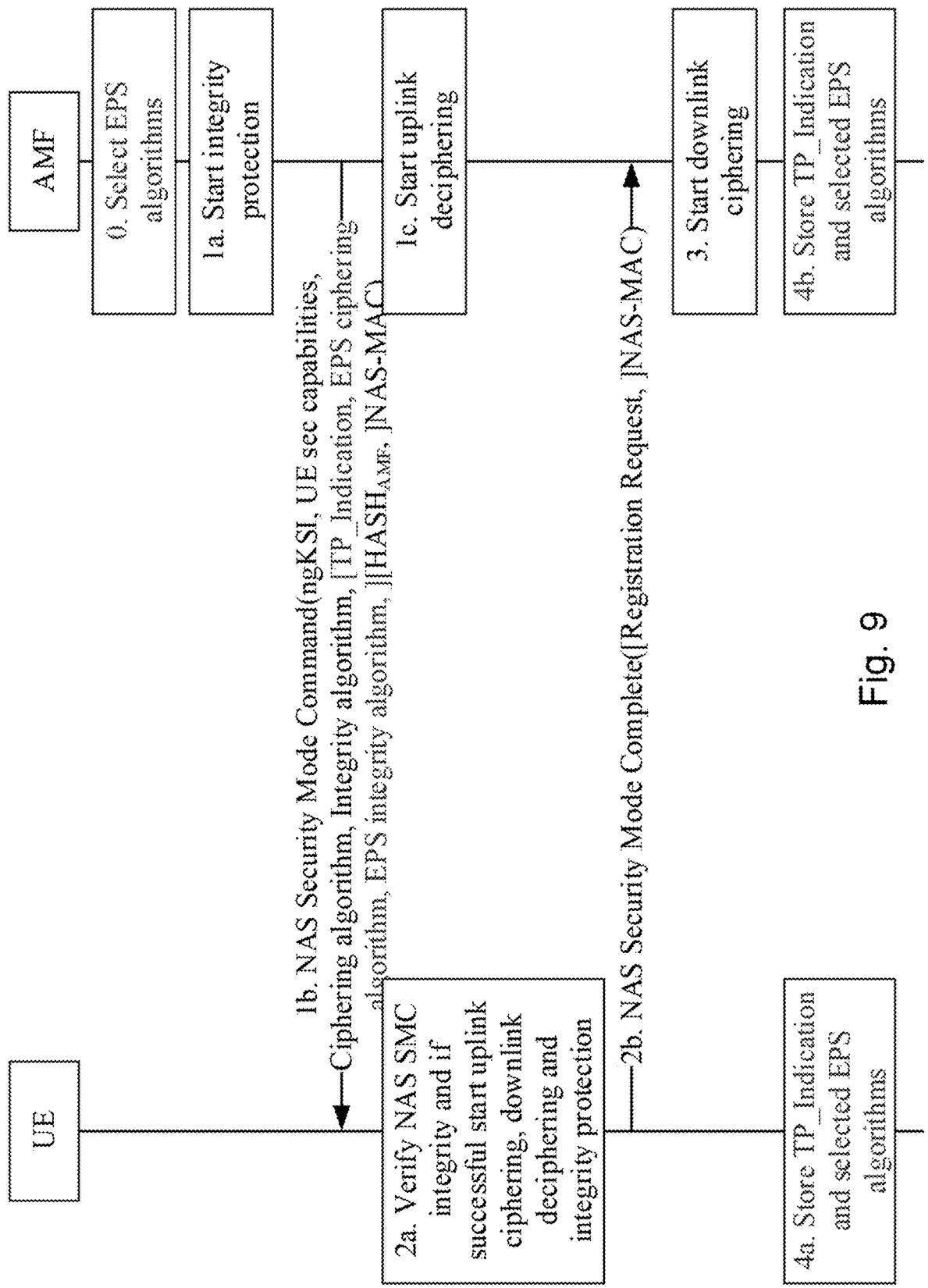
FIG. 9 is a schematic diagram illustrating an example of a NAS SMC procedure with TAU protection indication according to an embodiment.

FIG. 9 is a schematic diagram illustrating an example of a NAS SMC procedure with TAU protection indication according to an embodiment. FIG. 9 shows the addition of the TAU Protection Indication (TP_Indication) to the NAS SMC procedure flow. This indication is stored in the UE as part of the 5G security context and at the AMF side as part of the UE security context.

Figure 10:
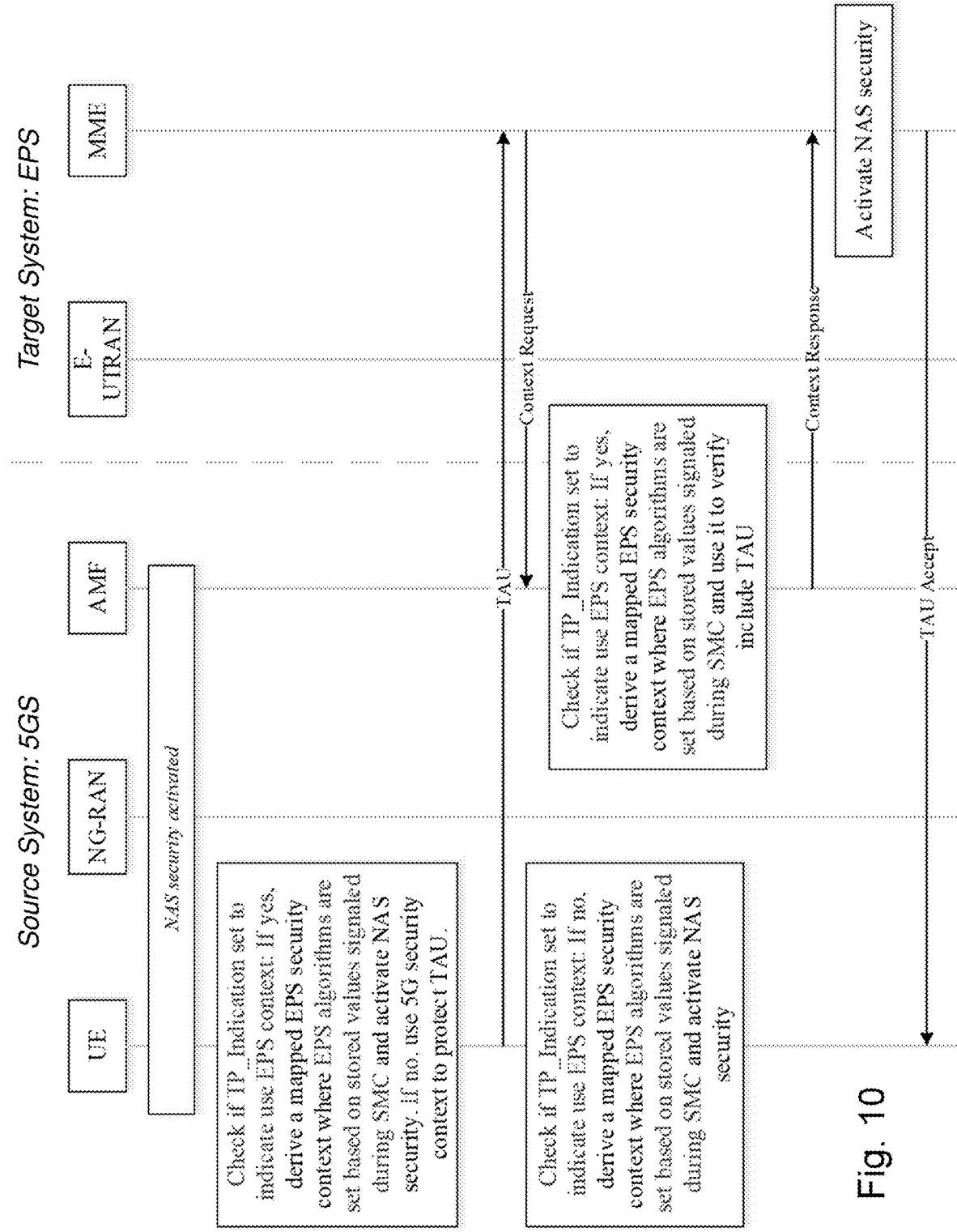
FIG. 10 is a schematic diagram illustrating an example of usage of TAU protection indication during idle mode mobility from 5GS/NGS to 4GS/EPS.

FIG. 10 is a schematic diagram illustrating an example of usage of TAU protection indication during idle mode mobility from 5GS/NGS to 4GS/EPS. FIG. 10 shows the usage of the indication during the mobility procedure.

This indication could be for example a Boolean flag that is, if set, indicates that the mapped EPS security context is to be used to protect the TAU message, the 5G security context otherwise. During the TAU procedure, the UE would check the stored TP_Indication to determine whether to use the mapped EPS security context for the protection of the TAU message or not. The source AMF checks the TP_Indication as well to determine whether it uses the mapped EPS context or the 5G security context for the verification of the TAU message expected to be included in the Context Request message from the target MME.

There are different possibilities related to the order of the derivation of the mapped EPS context and the checking of the indication steps. In FIG. 10, the derivation of the mapped EPS security context step can be performed before or after the TAU message transmission. In another embodiment, the UE can always start by deriving the mapped EPS security context, then checking the TP_Indication.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, there is provided a network unit configured to support interworking between different wireless communication systems, including a higher generation wireless system and a lower generation wireless system, to enable secure communication with a wireless communication device, wherein the network unit is configured to select, in connection with a registration procedure and/or a security context activation procedure of the wireless communication device with the higher generation wireless system, at least one security algorithm of the lower generation wireless system, also referred to as lower generation security algorithm(s);

wherein the network unit is configured to send a control message including information on the selected lower generation security algorithm(s) to the wireless communication device; and wherein the network unit is configured to store information on the selected lower generation security algorithm(s) in the network unit.

According to a similar aspect, there is also provided a network unit configured to support idle mode mobility of a wireless communication device between different wireless communication systems, including a higher generation wireless system and a lower generation wireless system, wherein the network unit is configured to select, in connection with a registration procedure and/or a security context activation procedure of the wireless communication device with the higher generation wireless system, at least one security algorithm of the lower generation wireless system, also referred to as lower generation security algorithm(s);

wherein the network unit is configured to send a control message including information on the selected lower generation security algorithm(s) to the wireless communication device; and wherein the network unit is configured to store information on the selected lower generation security algorithm(s) in the network unit.

By way of example, the control message may be a security context activation procedure command.

In a particular example, the control message is a Non-Access Stratum, NAS, Security Mode Command, SMC, message.

For example, the network unit may be a network unit 10 of the higher generation wireless system 40.

As an example, the network unit 10 is a core network unit configured for mobility management.

In a particular example, the network unit 10 is an Access and Mobility management Function, AMF, unit.

By way of example, the network unit 10 is a network unit of a 5G/NGS system.

Alternatively, or complementary, the network unit 10 may be a cloud-based network unit.

According to another aspect, there is provided a wireless communication device configured to support interworking between different wireless communication systems, including a higher generation wireless system and a lower generation wireless system, to enable secure communication for the wireless communication device, wherein the wireless communication device is configured to receive, in connection with a registration procedure and/or a security context activation procedure of the wireless communication device with the higher generation wireless system, a control message including information on at least one security algorithm of the lower generation wireless system, also referred to as lower generation security algorithm(s);

wherein the wireless communication device is configured to store information on the selected lower generation security algorithm(s) in the wireless communication device.

By way of example, the control message may be a security context activation procedure command In a particular example, the control message is a Non-Access Stratum, NAS, Security Mode Command, SMC, message.

Figure 11C:
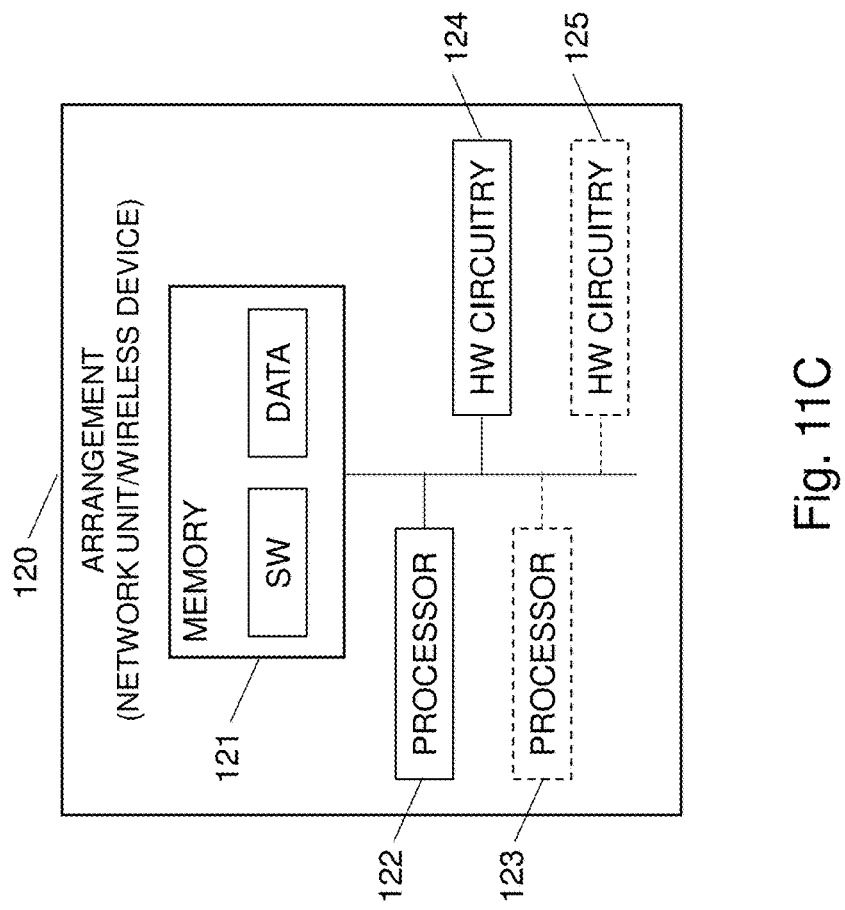
FIG. 11C is a schematic block diagram illustrating an example of an arrangement such as a network unit and/or wireless communication device configured to support interworking between different wireless communication systems according to yet another embodiment.
Figure 11A:
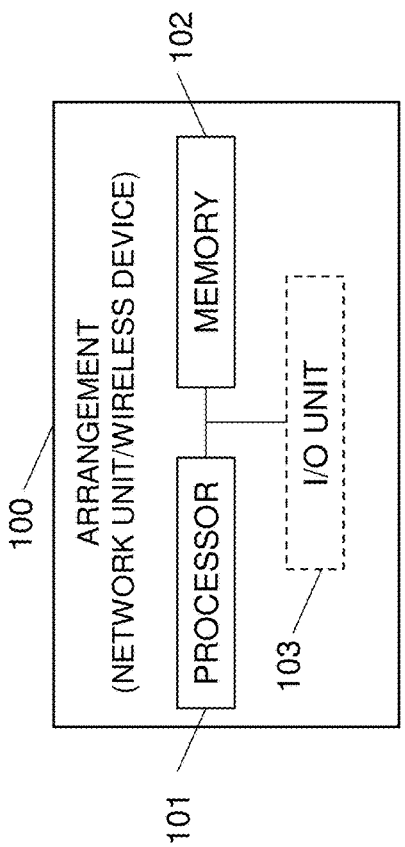
FIG. 11A is a schematic block diagram illustrating an example of an arrangement such as a network unit and/or wireless communication device configured to support interworking between different wireless communication systems according to an embodiment.

FIG. 11A is a schematic block diagram illustrating an example of an arrangement such as a network unit and/or wireless communication device configured to support interworking between different wireless communication systems according to an embodiment.

In this particular example, the arrangement 100 comprises a processor 101 and a memory 102, the memory 102 comprising instructions executable by the processor 101, whereby the processor is operative to perform the functions described herein, e.g. to support interworking and/or idle mode mobility between different wireless communication systems manage security contexts at idle mode mobility.

Optionally, the arrangement 100 may also include an input/output (I/O) unit 103. The I/O unit 103 may include functions for wired and/or wireless communication with other devices and/or network nodes in the network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, input port(s) and/or output port(s).

Figure 11B:
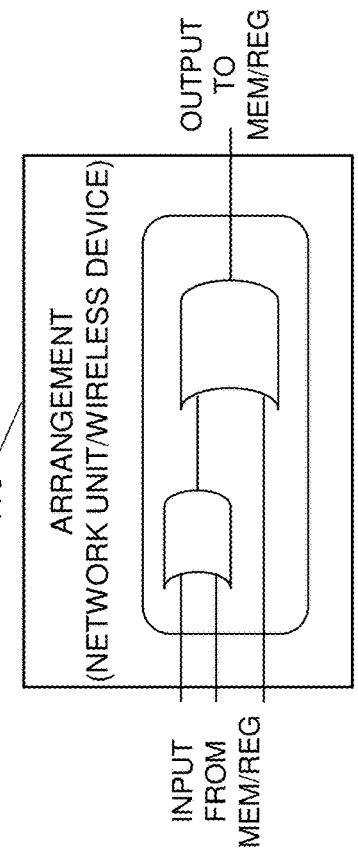
FIG. 11B is a schematic block diagram illustrating an example of an arrangement such as a network unit and/or wireless communication device configured to support interworking between different wireless communication systems according to another embodiment.

FIG. 11B is a schematic block diagram illustrating an example of an arrangement such as a network unit and/or a wireless communication device configured to support interworking between different wireless communication systems according to another embodiment.

In this example, the arrangement 110 is based on a hardware circuitry implementation. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

FIG. 11C is a schematic block diagram illustrating an example of an arrangement such as a network unit and/or wireless communication device configured to support interworking between different wireless communication systems according to yet another embodiment.

In this example, the arrangement 120 is based on combination of both processor(s) 122, 123 and hardware circuitry 124, 125 in connection with suitable memory unit(s) 121. The arrangement 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 12:
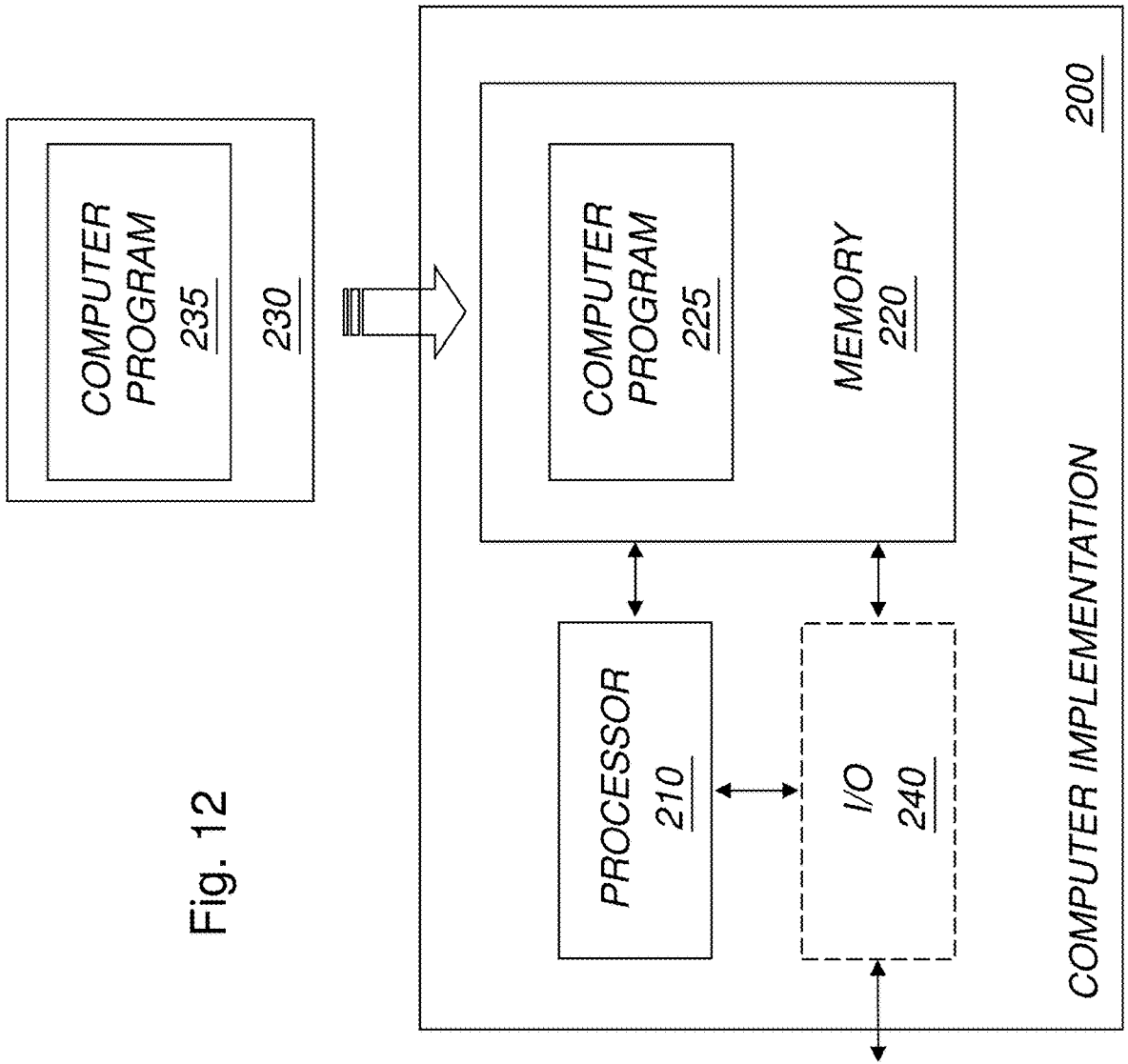
FIG. 12 is a schematic diagram illustrating an example of a computer-implementation according to an embodiment.

FIG. 12 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program 225; 235 comprises instructions, which when executed by at least one processor 210, cause the processor(s) 210 to perform the actions described herein.

According to a particular aspect, there is provided a computer program 225; 235 for supporting, when executed by a processor 210, interworking between different wireless communication systems, including a higher generation wireless system and a lower generation wireless system, to enable secure communication with a wireless communication device, wherein the computer program 225; 235 comprises instructions, which when executed by the processor 210, cause the processor 210 to:

select, in connection with a registration procedure and/or a security context activation procedure of the wireless communication device with the higher generation wireless system, at least one security algorithm of the lower generation wireless system, also referred to as lower generation security algorithm(s);

generate a control message including information on the selected lower generation security algorithm(s) for transmission to the wireless communication device; and store information on the selected lower generation security algorithm(s).

According to yet another aspect, there is provided a computer program product comprising a computer-readable medium 220; 230 in which a computer program 225; 235 of the above aspect is carried or stored.

According to another aspect, there is provided a computer program 225; 235 for supporting, when executed by a processor 210, interworking between different wireless communication systems, including a higher generation wireless system and a lower generation wireless system, to enable secure communication for a wireless communication device, wherein the computer program 225; 235 comprises instructions, which when executed by the processor 210, cause the processor 210 to:

receive, in connection with a registration procedure and/or a security context activation procedure of the wireless communication device with the higher generation wireless system, a control message including information on at least one security algorithm of the lower generation wireless system, also referred to as lower generation security algorithm(s);

store information on the selected lower generation security algorithm(s) in the wireless communication device.

According to still another aspect, there is provided a computer program product comprising a computer-readable medium 220; 230 in which a computer program 225; 235 of the above aspect is carried or stored.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 13:
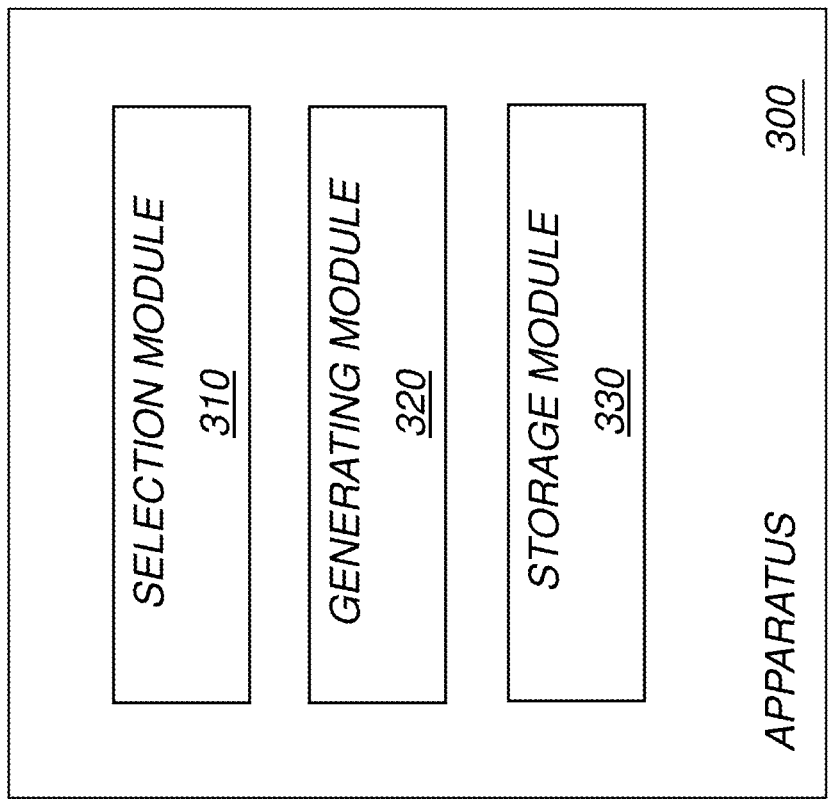
FIG. 13 is a schematic diagram illustrating an example of an apparatus for supporting interworking between different wireless communication systems.

FIG. 13 is a schematic diagram illustrating an example of an apparatus for supporting interworking between different wireless communication systems, including a higher generation wireless system and a lower generation wireless system, to enable secure communication with a wireless communication device. The apparatus 300 comprises:

a selection module 310 for selecting, in connection with a registration procedure and/or a security context activation procedure of the wireless communication device with the higher generation wireless system, at least one security algorithm of the lower generation wireless system, also referred to as lower generation security algorithm(s);

a generating module 320 for generating a control message including information on the selected lower generation security algorithm(s) for transmission to the wireless communication device; and a storage module 330 for storing information on the selected lower generation security algorithm(s) in the network unit.

Figure 14:
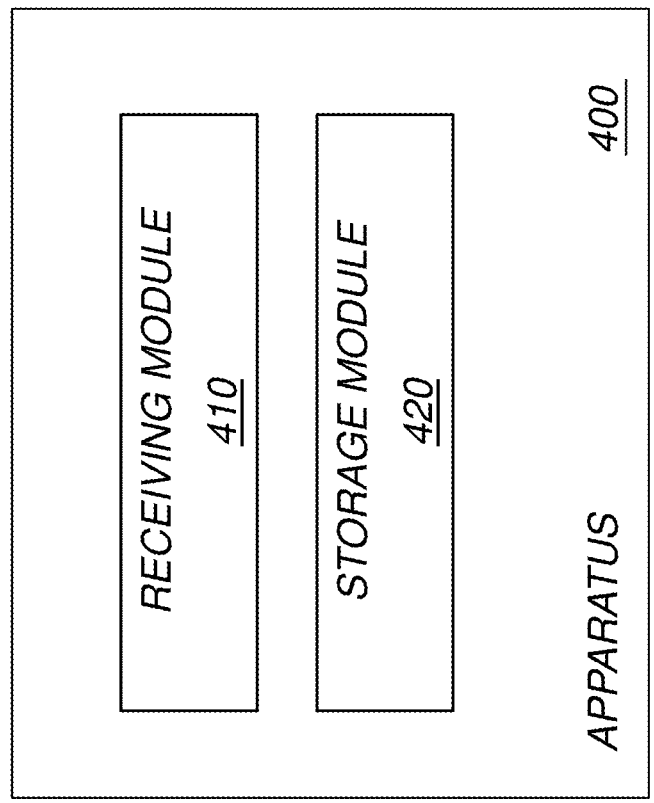
FIG. 14 is a schematic diagram illustrating an example of an apparatus for supporting interworking between different wireless communication systems.

FIG. 14 is a schematic diagram illustrating an example of an apparatus for supporting interworking between different wireless communication systems, including a higher generation wireless system and a lower generation wireless system, to enable secure communication for a wireless communication device. The apparatus 400 comprises:

a receiving module 410 for receiving, in connection with a registration procedure and/or a security context activation procedure of the wireless communication device with the higher generation wireless system, a control message including information on at least one security algorithm of the lower generation wireless system, also referred to as lower generation security algorithm(s);

a storage module 420 for storing information on the selected lower generation security algorithm(s) in the wireless communication device.

Alternatively it is possible to realize the module(s) in FIG. 13 and/or FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

For example, a so-called virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The proposed technology is generally applicable to management of security contexts in wireless communications. The proposed technology may be applied to many specific applications and communication scenarios including secure communication within wireless networks, securely providing various services within such networks, including so-called Over-the-Top (OTT) services. For example, the proposed technology may provide the underlying security for secure communication, and enables and/or includes transfer and/or transmission and/or reception of relevant user data and/or control data in wireless communications.

In a complementary aspect, the proposed technology relates to a method, performed by a wireless device, further involving providing user data, and forwarding the user data to a host computer via the transmission to a network node.

In another complementary aspect, the proposed technology relates to a corresponding wireless device comprising processing circuitry configured to perform any of the steps of such a method.

In yet another complementary aspect, the proposed technology relates to a method, performed by a network node, further involving obtaining user data, and forwarding the user data to a host computer or a wireless device.

In still another complementary aspect, the proposed technology relates to a corresponding network node such as a base station comprising processing circuitry configured to perform any of the steps of such a method.

The proposed technology may also relate to a corresponding communication system including a host computer and/or a wireless device and/or a network node.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often be desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 15:
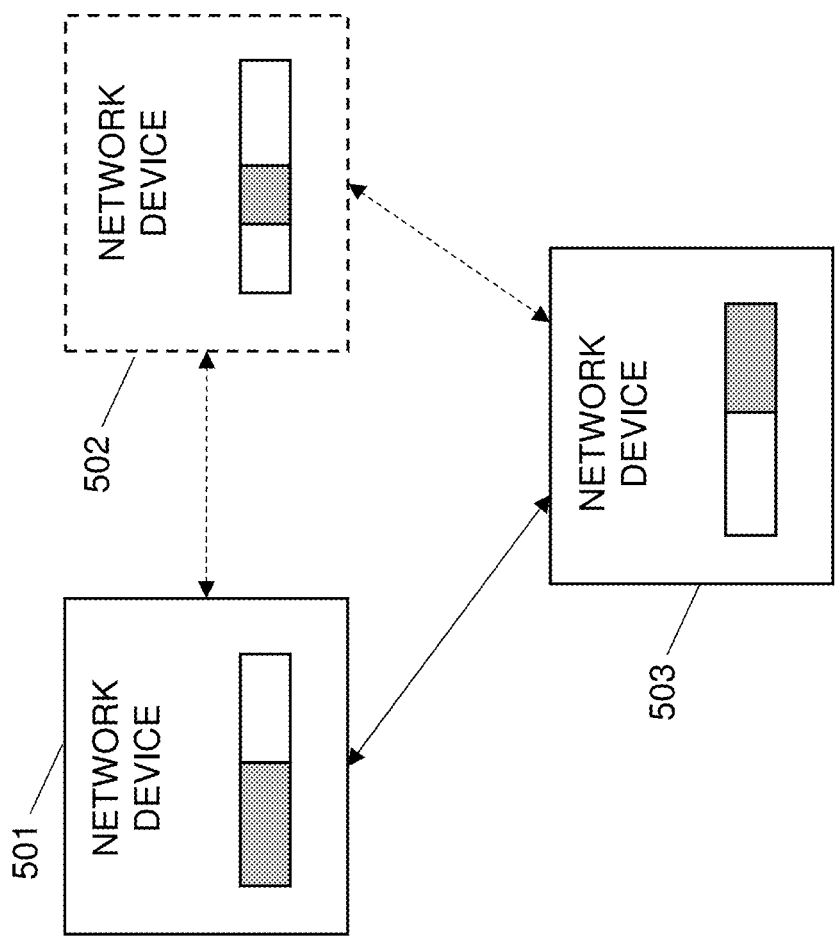
FIG. 15 schematically illustrates a distributed implementation among network devices.

FIG. 15 is a schematic diagram illustrating an example of how functionality can be distributed or partitioned between different network devices in a general case. In this example, there are at least two individual, but interconnected network devices 501, 502, which may have different functionalities, or parts of the same functionality, partitioned between the network devices 501, 502. There may be additional network devices 503 being part of such a distributed implementation. The network devices 501, 502, 503 may be part of the same wireless or wired communication system, or one or more of the network devices may be so-called cloud-based network devices located outside of the wireless or wired communication system.

In the following, a set of illustrative non-limiting examples will now be described with reference to FIGS. 16-22.

Figure 16:
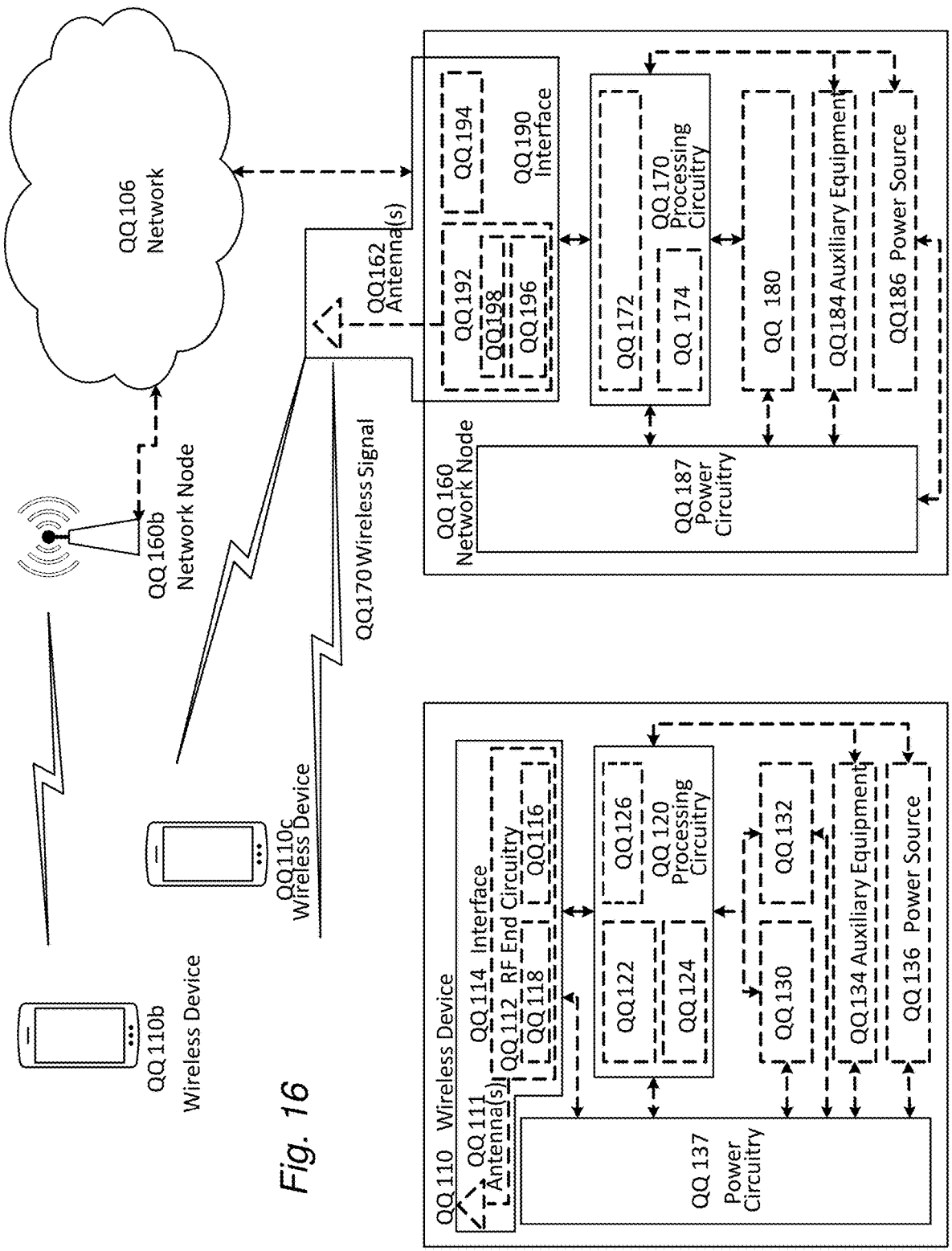
FIG. 16 is a schematic diagram illustrating an example of a wireless network in accordance with some embodiments.

FIG. 16 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 16 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 17:
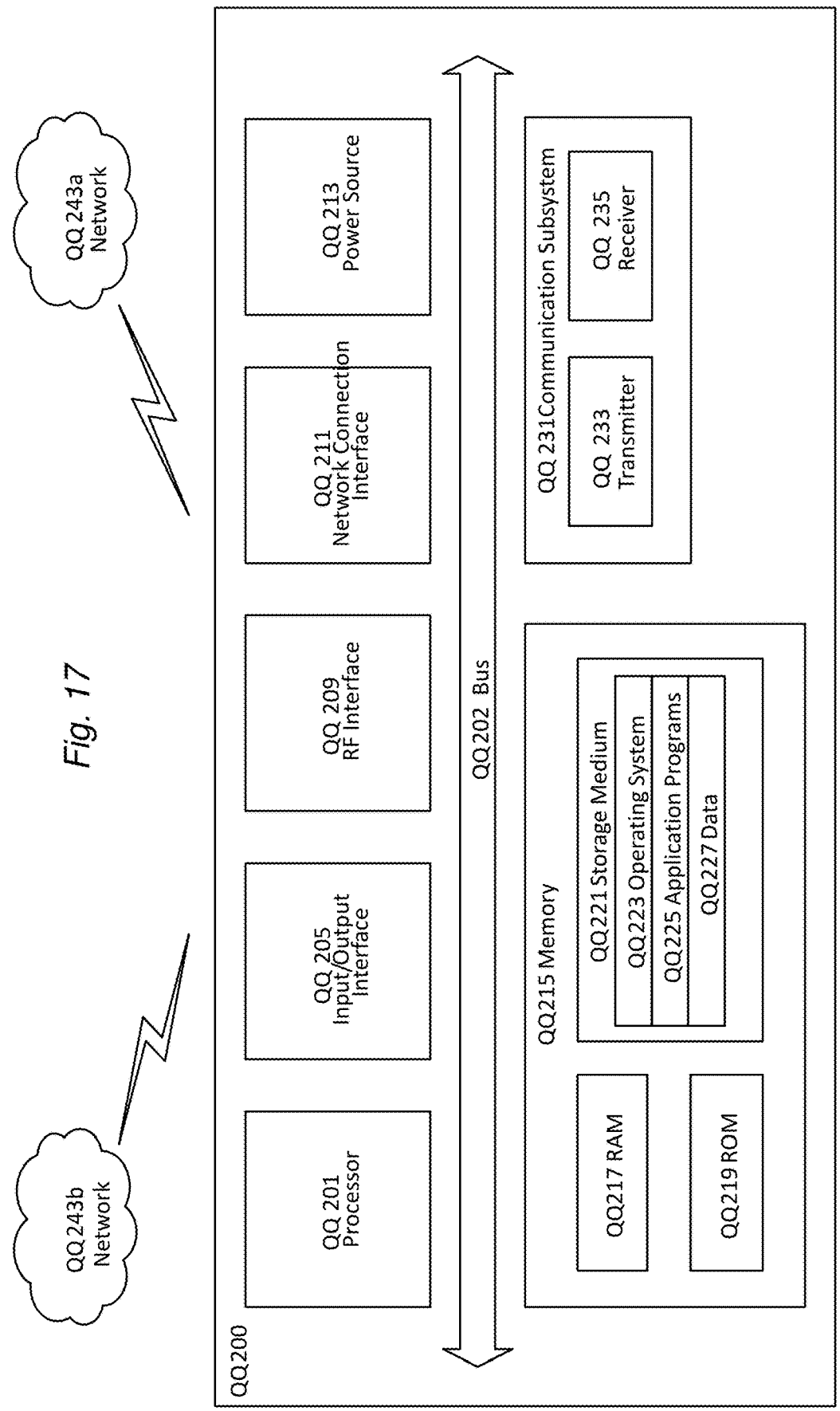
FIG. 17 is a schematic diagram illustrating an example of an embodiment of a UE in accordance with various aspects described herein.

FIG. 17 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 17, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 18:
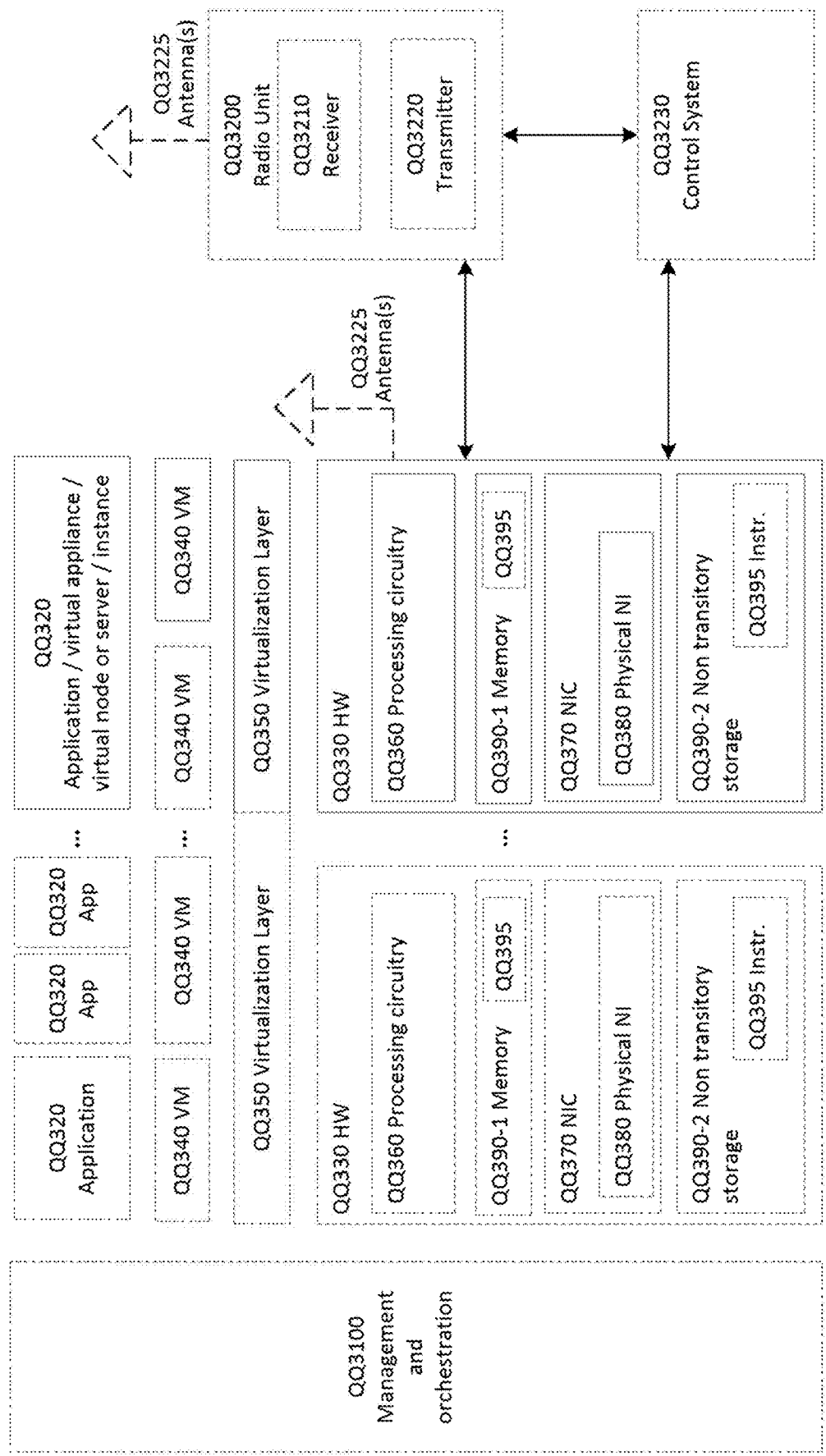
FIG. 18 is a schematic block diagram illustrating an example of a virtualization environment in which functions implemented by some embodiments may be virtualized.

FIG. 18 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 18, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 18.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 19:
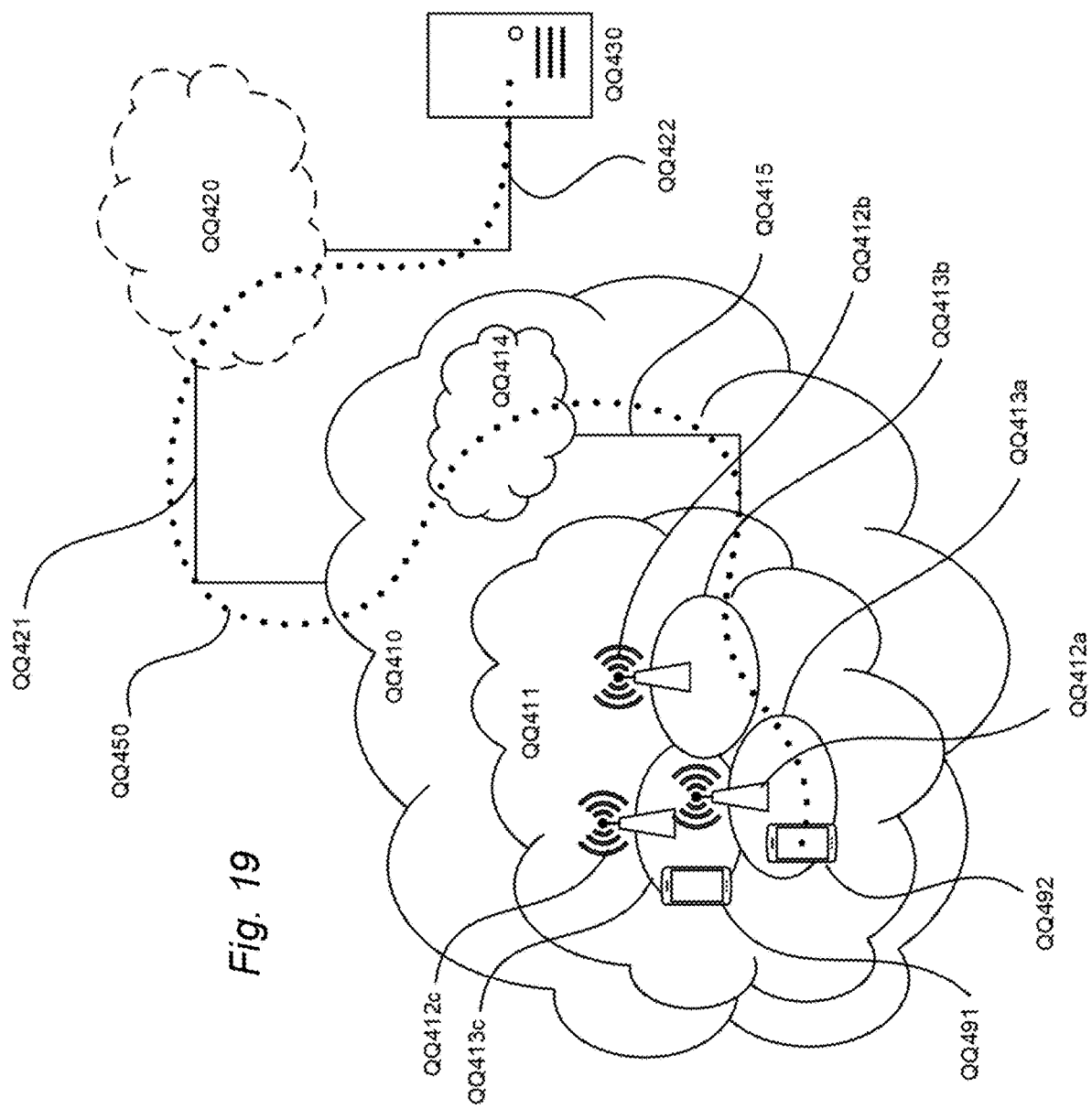
FIG. 19 is a schematic diagram illustrating an example of a telecommunication network connected via an intermediate network to a host computer in accordance with some embodiments.

FIG. 19 is a schematic diagram illustrating an example of a telecommunication network connected via an intermediate network to a host computer in accordance with some embodiments.

With reference to FIG. 19, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 19 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 20:
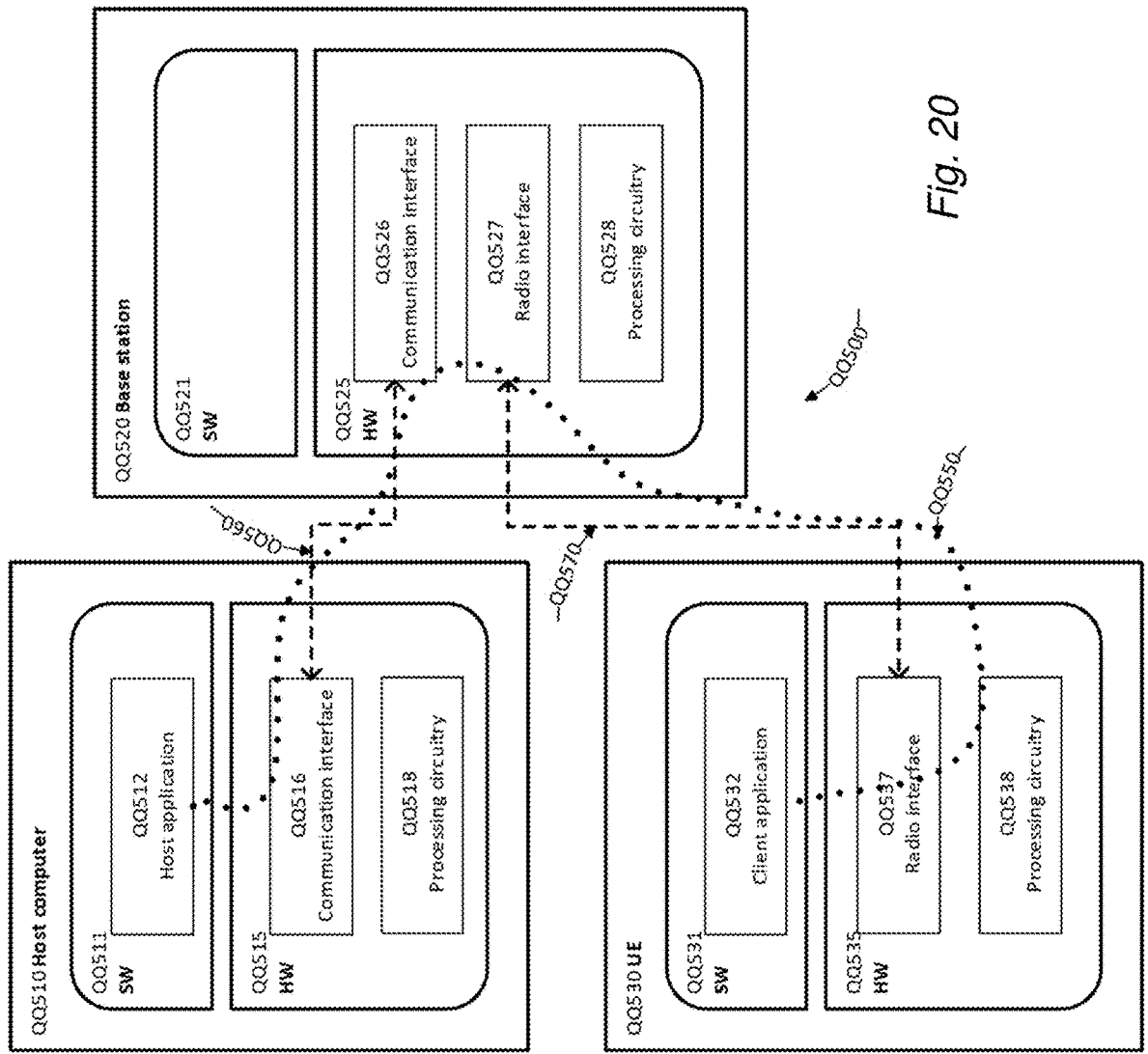
FIG. 20 is a schematic diagram illustrating an example of a host computer communicating via a base station with a user equipment over a partially wireless connection in accordance with some embodiments.

FIG. 20 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 20. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 20) served by base station QQ520. Communication interface QQ526 may be configured to facilitate connection QQ560 to host computer QQ510. Connection QQ560 may be direct or it may pass through a core network (not shown in FIG. 20) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 20 may be similar or identical to host computer QQ430, one of base stations QQ412a, QQ412b, QQ412c and one of UEs QQ491, QQ492 of FIG. 19, respectively. This is to say, the inner workings of these entities may be as shown in FIG. 20 and independently, the surrounding network topology may be that of FIG. 19.

In FIG. 20, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 21B:
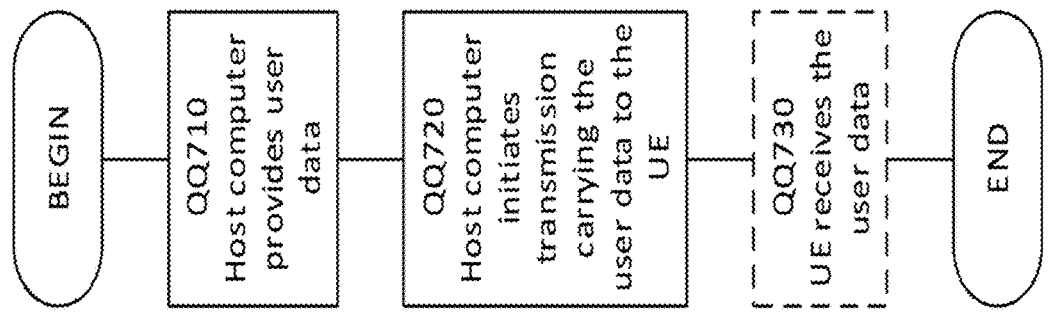
FIGS. 21A-B are schematic flow diagrams illustrating examples of methods implemented in a communication system including, e.g. a host computer, and optionally also a base station and a user equipment in accordance with some embodiments.
Figure 21A:
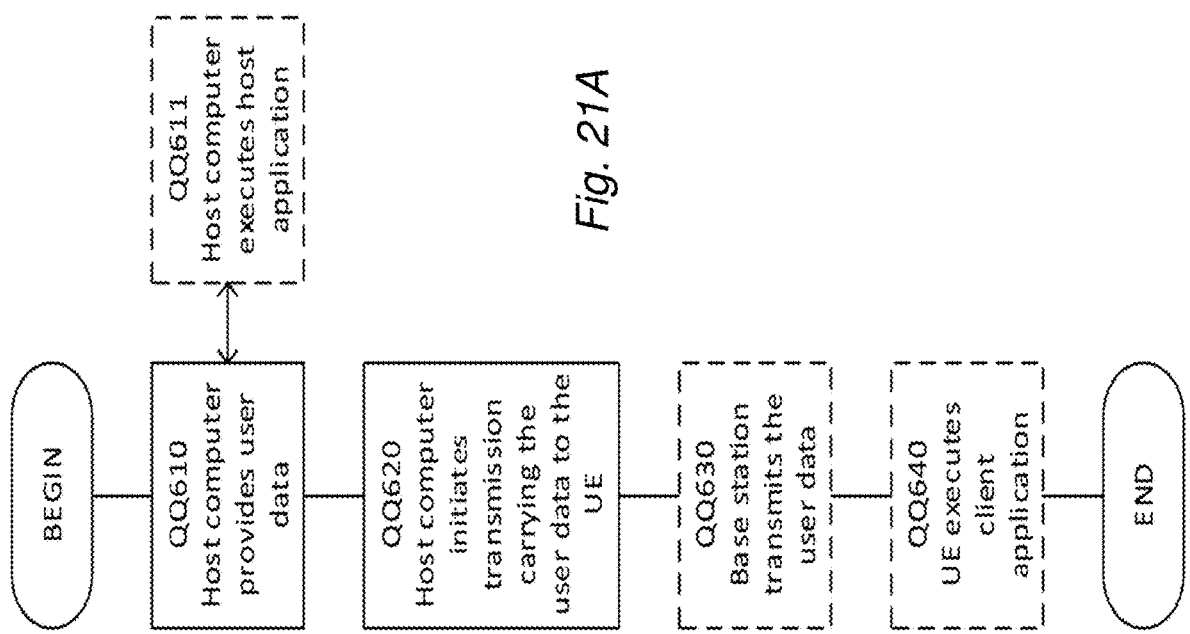

FIGS. 21A-B are schematic flow diagrams illustrating examples of methods implemented in a communication system including, e.g. a host computer, and optionally also a base station and a user equipment in accordance with some embodiments.

FIG. 21A is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 21A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 21B is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 21B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 22A, 22B:
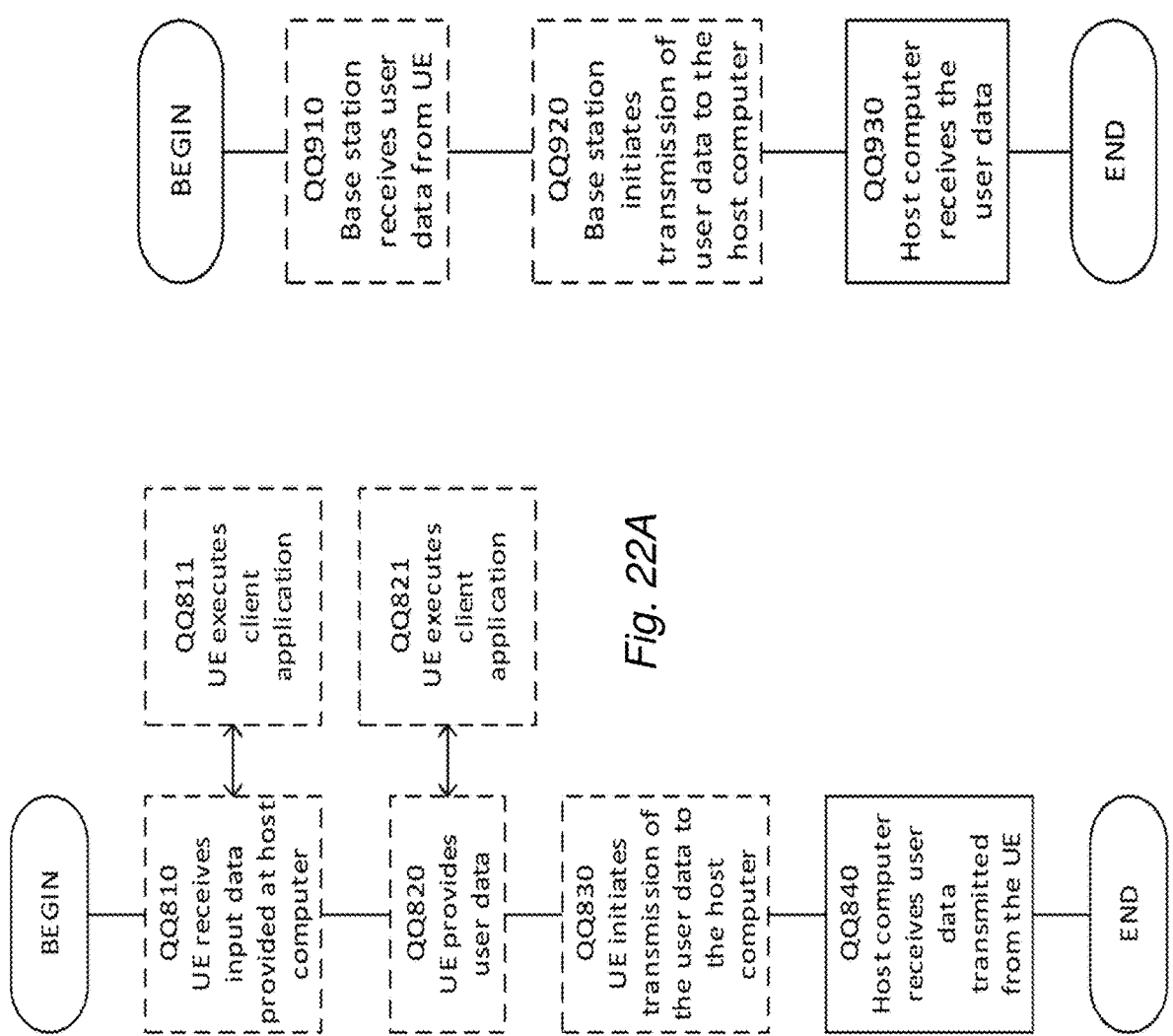
FIGS. 22A-B are schematic diagrams illustrating examples of methods implemented in a communication system including a host computer, a base station and a user equipment in accordance with some embodiments.

FIGS. 22A-B are schematic diagrams illustrating examples of methods implemented in a communication system including a host computer, a base station and a user equipment in accordance with some embodiments.

FIG. 22A is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 22A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22B is a flowchart illustrating a method implemented in a communication system, in accordance with one embodiment. The communication system includes a host computer, a base station and a UE which may be those described with reference to FIG. 19 and FIG. 20. For simplicity of the present disclosure, only drawing references to FIG. 22B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises:
  obtaining user data; and
  forwarding the user data to a host computer or a wireless device.

There is also provided a network node such as a base station comprising processing circuitry configured to perform any of the steps of the method described herein.

There is further provided a communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method, performed by a network unit, for supporting interworking between different wireless communication systems, including a higher generation wireless system and a lower generation wireless system, to enable secure communication with a wireless communication device, wherein the method comprises:
selecting, in connection with a registration procedure and/or a security context activation procedure of the wireless communication device with the higher generation wireless system, at least one security algorithm of the lower generation wireless system, also referred to as lower generation security algorithm(s);
sending a control message including information on the selected lower generation security algorithm(s) to the wireless communication device; and
storing information on the selected lower generation security algorithm(s) in the network unit.

2. The method of claim 1, wherein the method is performed by a network unit of the higher generation wireless system when the wireless communication device registers and initiates establishment of a security context with the higher generation wireless system.

3. The method of claim 2, wherein the network unit of the higher generation wireless system is a core network unit configured for mobility management, and/or a cloud-based network unit.

4. The method of claim 2, wherein the network unit of the higher generation wireless system is an Access and Mobility management Function, AMF, unit.

5. The method of claim 1, wherein the control message is a security context activation procedure command.

6. The method of claim 1, wherein the control message is a Non-Access Stratum, NAS, Security Mode Command, SMC, message.

7. The method of claim 1, wherein the lower generation security algorithm(s) is/are selected based on security capabilities of the wireless device in the higher generation wireless system, which is a superset of the security capabilities of the wireless device in the lower generation wireless system.

8. The method of claim 7, wherein information on the security capabilities of the wireless device in the lower generation wireless system is/are included in information on the security capabilities of the wireless device in the higher generation wireless system.

9. The method of claim 7, wherein information on the security capabilities of the wireless device is received in a Registration Request in the higher generation wireless system.

10. The method of claim 1, wherein the control message also includes information on selected higher generation security algorithm(s).

11. The method of claim 1, wherein the higher generation wireless system is a 5G/NGS system and the lower generation wireless system is a 4G/EPS system, or the higher generation wireless system is a 5G/NGS system and the lower generation wireless system is a 3G/UMTS system, or the higher generation wireless system is a 4G/EPS system and the lower generation wireless system is a 3G/UMTS system.

12. The method of claim 1, further comprising activating Non-Access Stratum, NAS, security and/or GPRS Mobility Management, GMM, security with the lower generation wireless system based on the stored selected lower generation security algorithm(s) during idle mode mobility of the wireless communication device.

13. The method of claim 1, wherein the method further comprises sending information to the wireless communication device indicating a security context to be used for integrity protection of a Tracking Area Update, TAU, message.

14. The method of claim 13, wherein the information indicating a security context to be used for integrity protection of a TAU message is sent together with the information on the selected lower generation security algorithm(s) in the control message.

15. The method of claim 13, wherein the information indicating a security context to be used for integrity protection of a TAU message includes information indicating whether a higher generation security context or a lower generation security context is to be used for integrity protection of the TAU message.

16. A method, performed by a wireless communication device, for supporting interworking between different wireless communication systems, including a higher generation wireless system and a lower generation wireless system, to enable secure communication for the wireless communication device, wherein the method comprises:

receiving, in connection with a security context activation procedure of the wireless communication device with the higher generation wireless system, a control message including information on at least one security algorithm of the lower generation wireless system, also referred to as lower generation security algorithm(s);

storing information on the selected lower generation security algorithm(s) in the wireless communication device.

17. The method of claim 16, wherein the control message is a security context activation procedure command.

18. The method of claim 16, wherein the control message is a Non-Access Stratum, NAS, Security Mode Command, SMC, message.

19. The method of claim 16, wherein the method further comprises receiving information indicating a security context to be used for integrity protection of a Tracking Area Update, TAU, message.

20. The method of claim 16, wherein the higher generation wireless system is a 5G/NGS system and the lower generation wireless system is a 4G/EPS system, or the higher generation wireless system is a 5G/NGS system and the lower generation wireless system is a 3G/UMTS system, or the higher generation wireless system is a 4G/EPS system and the lower generation wireless system is a 3G/UMTS system.

* * * * *

UNITED STATES PATENT AND TRADEMARK OFFICE
CERTIFICATE OF CORRECTION

PATENT NO. : 11,778,475 B2
APPLICATION NO. : 17/889172
DATED : October 3, 2023
INVENTOR(S) : Ben Henda et al.

It is certified that error appears in the above-identified patent and that said Letters Patent is hereby corrected as shown below:

On the Title Page

Item (56), in Column 2, Line 4, delete "V0.8 0," and insert -- V0.8.0, --, therefor.

On Page 2, Item (56), in Column 2, Line 3, delete "sysmtem" and insert -- system --, therefor.

On Page 2, Item (56), in Column 2, Line 14, delete "MME ," and insert -- MME, --, therefor.

In the Specification

In Column 14, Line 46, delete "a be a" and insert -- be a --, therefor.

In Column 14, Line 50, delete "algorithms" and insert -- algorithms. --, therefor.

In Column 14, Line 51, delete "the" and insert -- of the --, therefor.

In Column 16, Lines 50-51, delete "that is," and insert -- that, --, therefor.

In Column 17, Line 29, delete "of the" and insert -- the --, therefor.

In Column 18, Line 38, delete "command" and insert -- command. --, therefor.

In Column 23, Line 1, delete "often" and insert -- often be --, therefor.

In Column 24, Line 33, delete "(NFV))." and insert -- (NFV). --, therefor.

In Column 26, Line 62, delete "NodeB's." and insert -- NodeBs. --, therefor.

In Column 27, Line 37, delete "(SOC)." and insert -- (SoC). --, therefor.

Signed and Sealed this
Nineteenth Day of March, 2024

*Katherine Kelly Vidal*
Katherine Kelly Vidal
*Director of the United States Patent and Trademark Office*

CERTIFICATE OF CORRECTION (continued)
U.S. Pat. No. 11,778,475 B2

In Column 27, Line 47, delete "units" and insert -- units. --, therefor.

In Column 30, Line 9, delete "cameras," and insert -- camera, --, therefor.

In Column 30, Line 16, delete "(CPE). a" and insert -- (CPE), a --, therefor.

In Column 31, Line 48, delete "SOC." and insert -- SoC. --, therefor.

In Column 33, Line 54, delete "QQ2200" and insert -- QQ200 --, therefor.

In Column 33, Line 63, delete "interchangeable." and insert -- interchangeably. --, therefor.

In Column 35, Line 39, delete "high-density" and insert -- high definition --, therefor.

In Column 35, Line 46, delete "(SIM/RUIM) module," and insert -- module (SIM/RUIM), --, therefor.

In Column 37, Lines 14, delete "QQ390. Memory QQ390" and insert -- QQ390-1. Memory QQ390-1 --, therefor.

In Column 38, Line 1, delete "onto" and insert -- into --, therefor.

In Column 39, Line 29, delete "embodiments" and insert -- embodiments. --, therefor.

In Column 40, Line 50, delete "which it" and insert -- which --, therefor.

In Column 41, Line 17, delete "etc.; the" and insert -- etc. The --, therefor.

In Column 41, Line 22, delete "QQ510's" and insert -- QQ510 --, therefor.

In Column 42, Line 24, delete "substep QQ830" and insert -- step QQ830 --, therefor.